United States Patent
Shemer et al.

(10) Patent No.: US 10,747,606 B1
(45) Date of Patent: Aug. 18, 2020

(54) RISK BASED ANALYSIS OF ADVERSE EVENT IMPACT ON SYSTEM AVAILABILITY

(71) Applicant: EMC IP Holding Company LLC, Hopkinton, MA (US)

(72) Inventors: Jehuda Shemer, Kfar Saba (IL); Assaf Natanzon, Tel Aviv (IL); Leehod Baruch, Rishon Leziyon (IL); Ron Bigman, Holon (IL); Amit Lieberman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 80 days.

(21) Appl. No.: 15/386,754

(22) Filed: Dec. 21, 2016

(51) Int. Cl.
| | |
|---|---|
| *G06F 11/07* | (2006.01) |
| *G06Q 10/06* | (2012.01) |
| *G06F 11/30* | (2006.01) |
| *G06F 3/06* | (2006.01) |
| *H04L 29/06* | (2006.01) |

(52) U.S. Cl.
CPC ........ *G06F 11/0793* (2013.01); *G06F 3/0647* (2013.01); *G06F 11/0709* (2013.01); *G06F 11/079* (2013.01); *G06F 11/0754* (2013.01); *G06F 11/3055* (2013.01); *G06Q 10/0635* (2013.01); *G06F 3/0646* (2013.01); *G06F 11/3006* (2013.01); *H04L 63/1433* (2013.01); *H04L 63/1441* (2013.01)

(58) Field of Classification Search
CPC .... G06F 3/0653; G06F 3/0647; G06F 3/0646; G06F 3/067; G06F 2212/1032; G06F 2212/1036; G06F 11/0709; G06F 11/0793; G06F 11/079; G06F 11/30; G06F 11/3006; G06F 11/3034; G06F 11/3055
See application file for complete search history.

(56) References Cited

U.S. PATENT DOCUMENTS

| | | | |
|---|---|---|---|
| 5,889,935 | A | 3/1999 | Ofek |
| 6,044,444 | A | 3/2000 | Ofek |
| 7,203,741 | B2 | 4/2007 | Marco et al. |
| 7,225,250 | B1 * | 5/2007 | Harrop ................ H04L 41/0681 709/223 |
| 7,383,463 | B2 | 6/2008 | Hayden et al. |
| 7,719,443 | B1 | 5/2010 | Natanzon |
| 7,840,536 | B1 | 11/2010 | Ahal et al. |

(Continued)

OTHER PUBLICATIONS

EMC Corporation, "EMC RECOVERPOINT/EX;" Applied Technology; White Paper; Apr. 2012; 17 Pages.

(Continued)

*Primary Examiner* — Joseph O Schell
(74) *Attorney, Agent, or Firm* — Daly Crowley Mofford & Durkee, LLP

(57) ABSTRACT

A computer-implemented method is provided. First information is received from at least a first data source. Based at least in part on analysis of the received first information, a determination of a first risk of a first adverse event is made, the risk affecting a first entity associated with a first location. Based at least in part on the first risk, at least a first impact from the first adverse event on the first entity is determined. At least a first action is dynamically caused to occur either before the completion of the first adverse event, the first action configured to substantially mitigate the first impact.

20 Claims, 11 Drawing Sheets

(56) References Cited

U.S. PATENT DOCUMENTS

| | | |
|---|---|---|
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,135,135 B2 | 3/2012 | Biddle et al. |
| 8,156,195 B2 | 4/2012 | Hagglund et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,700,575 B1 | 4/2014 | Srinivasan et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,507 B1 | 11/2014 | Crable et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,100,282 B1 | 8/2015 | Raps et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,309 B1 * | 11/2015 | Ma .................. G06F 11/3034 |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,218,251 B1 | 12/2015 | Hemashekar et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,448,544 B2 | 9/2016 | Slessman et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |

(56) References Cited

U.S. PATENT DOCUMENTS

| | | |
|---|---|---|
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,048,996 B1 * | 8/2018 | Bell ............ G06F 11/079 |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,235,055 B1 | 3/2019 | Saad et al. |
| 10,235,060 B1 | 3/2019 | Baruch et al. |
| 10,235,061 B1 | 3/2019 | Natanzon et al. |
| 10,235,064 B1 | 3/2019 | Natanzon et al. |
| 10,235,087 B1 | 3/2019 | Baruch et al. |
| 10,235,088 B1 | 3/2019 | Baruch et al. |
| 10,235,090 B1 | 3/2019 | Baruch et al. |
| 10,235,091 B1 | 3/2019 | Ayzenberg et al. |
| 10,235,092 B1 | 3/2019 | Natanzon et al. |
| 10,235,145 B1 | 3/2019 | Natanzon et al. |
| 10,235,196 B1 | 3/2019 | Natanzon et al. |
| 10,235,247 B1 | 3/2019 | Natanzon et al. |
| 10,235,249 B1 | 3/2019 | Natanzon et al. |
| 10,235,252 B1 | 3/2019 | Lieberman et al. |
| 10,250,679 B1 | 4/2019 | Natanzon et al. |
| 10,255,137 B1 | 4/2019 | Panidis et al. |
| 10,255,291 B1 | 4/2019 | Natanzon et al. |
| 2006/0053338 A1 * | 3/2006 | Cousins ............ G06F 11/008 714/6.12 |
| 2006/0168473 A1 * | 7/2006 | Sahoo ............ G06F 11/1471 714/15 |
| 2006/0212744 A1 * | 9/2006 | Benner ............ G06F 11/1076 714/6.12 |
| 2008/0189578 A1 * | 8/2008 | Raghuraman ......... G06F 11/004 714/47.1 |
| 2014/0143610 A1 * | 5/2014 | Nakatsugawa ....... G06F 11/008 714/47.3 |
| 2015/0195192 A1 * | 7/2015 | Vasseur ............ G06F 11/2007 714/47.3 |
| 2015/0261642 A1 * | 9/2015 | Gottlib, III ......... G06F 11/3055 714/48 |
| 2016/0034362 A1 * | 2/2016 | Al-Wahabi ........... G06F 11/203 714/4.1 |
| 2016/0253563 A1 * | 9/2016 | Lam ...................... H04L 63/08 348/130 |
| 2016/0306691 A1 * | 10/2016 | Aneja ............ G06F 17/30864 |
| 2017/0011298 A1 * | 1/2017 | Pal ............................ G06N 5/04 |
| 2017/0249200 A1 * | 8/2017 | Mustafi ............ G06F 11/0709 |
| 2018/0074887 A1 * | 3/2018 | Braham ............ G06F 11/0709 |

OTHER PUBLICATIONS

Feldman, "A Practical Approach to Business Continuity and Disaster Recovery Planning;" DFC International Computing Inc; Nov. 2010; 69 Pages.
U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.

(56) References Cited

OTHER PUBLICATIONS

U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, field Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider et al.
U.S. Appl. No. 16/050,400, filed Jul. 31, 2018, Alkalay et al.
U.S. Appl. No. 16/179,295, filed Nov. 2, 2018, Natanzon et al.
U.S. Appl. No. 16/261,174, filed Jan. 29, 2019, Natanzon et al.
U.S. Appl. No. 16/368,008, filed Mar. 28, 2019, Natanzon et al.

\* cited by examiner

| Data Center Name | Location | Potential Adverse Event | Risk ranking (high, med, low) | Expected time | Expected Duration of Event | Comments/source |
|---|---|---|---|---|---|---|
| EMC #1 | Westborough MA | short power outage during planned construction | high | 8/1/2016 | 10 hours | Based on data center operational schedule |
| EMC #1 | Westborough MA | damage to equipment during planned construction | Medium-Low | | anytime during | Based on past history, during construction there usually is minor damage to at least some components |
| EMC #1 | Westborough MA | communications outage during planned construction | Medium | 8/1/2016 | 10 hours | Based on data center operational schedule |
| EMC #1 | Westborough MA | rolling power outage | Medium | 7/13/2016-9/30/2016 | 2-3 hours | Based on power utility needs, weather conditions, past history |
| EMC #1 | Westborough MA | Communications outage due to utility strikes | Medium-low | 7/13/16-7/29/2016 | several days | Based on social media, news reports, information about union negotiations, past history, building cameras, etc. |
| EMC #1 | Westborough MA | destruction of premises | low | n/a | n/a | Based on seismic data, news reports |
| EMC #1 | Westborough MA | data center hijacking | low | n/a | n/a | Based on social media, news reports, security briefings |

FIG. 5B

| Data Center Name | Location | Potential Adverse Event | Risk ranking (high, med, low) | Expected time | Expected Duration of Event | Comments/adverse |
|---|---|---|---|---|---|---|
| EMC #1 | Westborough, MA | short power outage during planned construction | high | 8/1/2016 | 10 hours | Based on data center operational schedule |
| EMC #1 | Westborough, MA | communications outage during planned construction | med | 8/1/2016 | 10 hours | Based on data center operational schedule |
| EMC #1 | Westborough, MA | destruction of premises | low | n/a | n/a | n/a |
| EMC #1 | Westborough, MA | data center hijacking | low | n/a | n/a | n/a |
| EMC #2 | Durham, NC | destruction of premises due to tornado | high | 7/25-2016 through 8/1/2016 | 2 weeks | Based on historical data this is period of high tornadoes in area |
| EMC #2 | Durham, NC | long power outage | high | 7/25-2016 through 8/1/2016 | 2 weeks | Based on historical data this is period of high tornadoes in area |
| Google #1 | Quilicura, Chile | destruction of premises due to Earthquake | med-high | 7/13/2016-7/16/2016 | event - few minutes; damage - months | Based on environment and government sources, historical info, tracking of seismic data, 2014 Earthquake and Tsunami |
| Google #1 | Quilicura, Chile | destruction of premises due to Tsunami | med-high | 7/13/2016-7/16/2016 | event - few minutes; damage - months | Based on environment and government sources, historical info, tracking of seismic data, 2014 Earthquake and Tsunami |
| EMC #3 | Cairo, Egypt | Data Center Hijacking | med | continuous | continuous | Based on continued civil unrest in local area |
| EMC #3 | Cairo, Egypt | Communications outage | med | continuous | continuous | Based on continued civil unrest in local area, acts of war and terrorism near key internet communications centers |

FIG. 5C

| Data Center Name | Location | Potential Adverse Event | Expected time | Severity | Effect on Data Center, Compensations? |
|---|---|---|---|---|---|
| EMC #1 | Westborough MA | short power outage during planned construction | 8/1/2016 | 10 hours | Minimal - backup generator available |
| EMC #1 | Westborough MA | communications outage during planned construction | 8/1/2016 | 10 hours | Minimal - backup generator available |
| EMC #1 | Westborough MA | destruction of premises | n/a | Major | Major but regular backups reduce impact |
| EMC #1 | Westborough MA | data center hijacking | n/a | Major | Major but regular backups reduce impact |
| EMC #2 | Durham, NC | destruction of premises due to tornado | 7/20-2016 through 8/1/2016 | Major | Reduced staff before event due to safety issues, switchover must happen as soon as forecast |
| EMC #2 | Durham, NC | long power outage | 7/20-2016 through 8/1/2016 | 2 weeks | Reduced staff before event due to safety issues, switchover must happen as soon as forecast |
| Google #1 | Quilicura, Chile | destruction of premises due to Earthquake | 7/15/2016-7/16/2016 | Major | Inoperable, no recovery |
| Google #2 | Quilicura, Chile | destruction of premises due to Tsunami | 7/15/2016-7/16/2016 | Major | Inoperable, no recovery |
| EMC #3 | Cairo, Egypt | Data Center Hijacking | continuous | Moderate | Outside mechanisms might be used to lock data from hijackers |
| EMC #3 | Cairo, Egypt | Communications outage | continuous | Moderate | May need to use satellite or Wifi for Asynch replication until regular paths restored |

FIG. 6B

RISK BASED ANALYSIS OF ADVERSE EVENT IMPACT ON SYSTEM AVAILABILITY

FIELD

This application relates at least to generally relate to devices, systems, and methods usable with data storage in computer systems. More particularly, this application relates at least to using data analytics to predict data center disasters to enable proactive data protection.

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data. One example of a data protection system is a distributed storage system. A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. Some existing data protection systems may provide continuous data protection, meaning that every change made to data is backed up. The backup storage system may be situated in the same physical location as the production storage system, or in a physically remote location.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In some embodiments, a computer-implemented method is provided. First information is received from at least a first data source. Based at least in part on analysis of the received first information, a determination of a first risk of a first adverse event is made, the risk affecting a first entity associated with a first location. Based at least in part on the first risk, at least a first impact from the first adverse event on the first entity is determined. At least a first action is dynamically caused to occur before completion of the first adverse, where the first action is configured to substantially mitigate the first impact.

In another aspect, a system is provided, comprising a processor and a memory. The memory is in operable communication with the processor. The memory stores computer program code that when executed on the processor causes the processor to perform operations. The processor receives first information from at least a first data source and determines, based at least in part on analysis of the received first information, a first risk of a first adverse event, the risk affecting a first entity associated with a first location. The processor determines, based at least in part on the first risk, at least a first impact from the first adverse event on the first entity. The processor dynamically causes at least a first action to occur before completion of the first adverse, the first action configured to substantially mitigate the first impact.

Details relating to this and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 5B is a first simplified table showing an illustrative set of probabilities created in accordance with FIGS. 3, 4, and 5A, in accordance with at least one illustrative embodiment of the instant disclosure;

FIG. 5C is a simplified table showing a second illustrative set of probabilities created in accordance with FIGS. 3, 4 and 5A, in accordance with at least one illustrative embodiment of the instant disclosure;

FIG. 6B is a first simplified table showing an illustrative set of classifications created in accordance with FIGS. 3, 4, 5A-5C, and 6A, in accordance with at least one illustrative embodiment of the instant disclosure;

DETAILED DESCRIPTION

Figure 1:
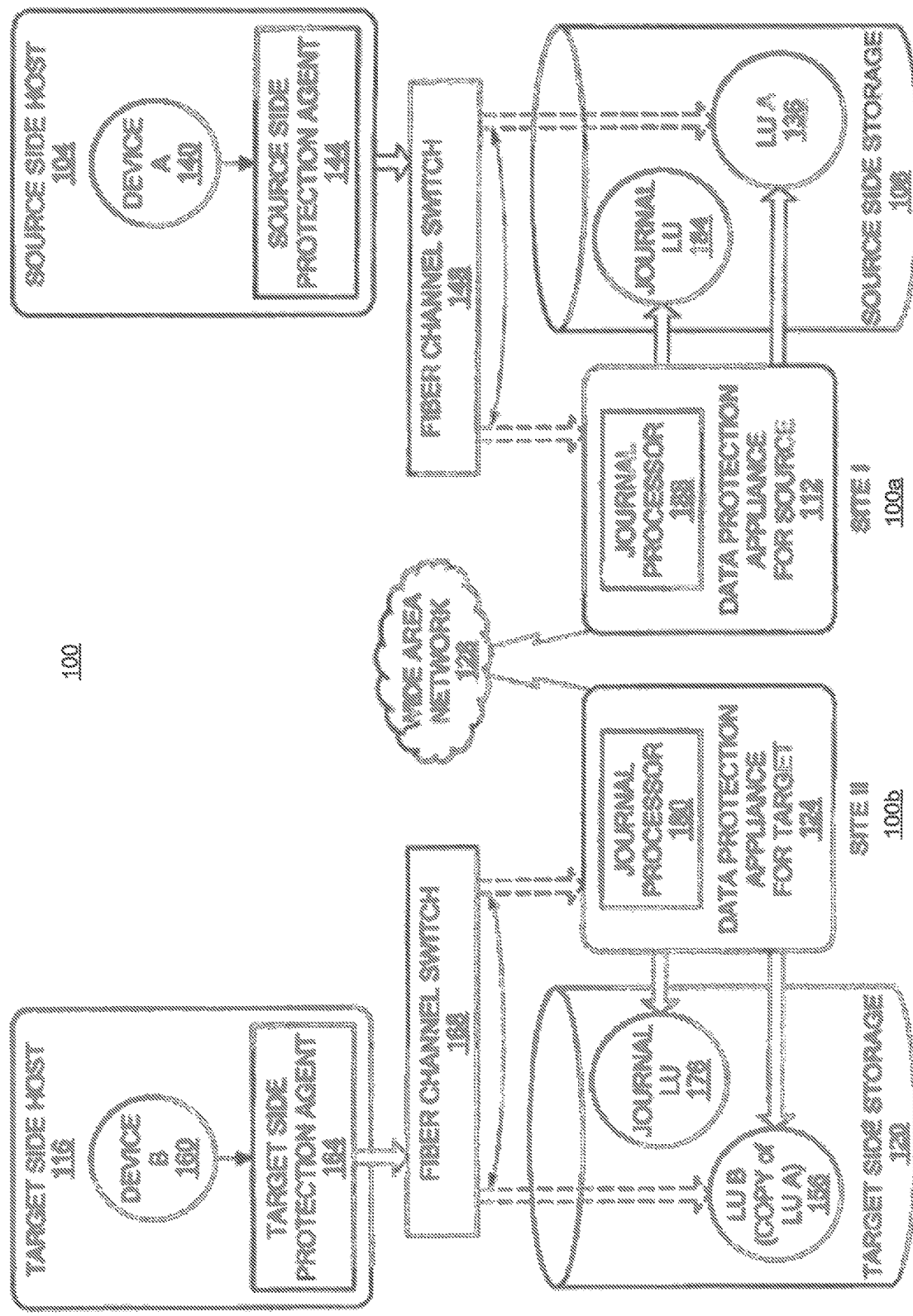
FIG. 1 is a simplified block diagram of a data protection system, in accordance with at least one illustrative embodiment of the instant disclosure.

At least some embodiments of the concepts, structures, and techniques sought to be protected herein are described below with reference to a data storage system in the form of a storage system configured to store files, but it should be understood that the principles of the concepts, structures, and techniques sought to be protected herein are not limited to this configuration. Rather, they are applicable at least to any entity capable of storing and handling various types of objects, in analog, digital, or other form. Although terms such as document, file, object, etc. may be used by way of example, the principles of the described embodiment are not limited to any particular form of representing and storing data or other information; rather, they are equally applicable at least to any object capable of representing information.

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or data write request. In some embodiments, the term "storage system" may encompass physical computing systems, cloud or virtual computing systems, or a combination thereof. In some embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices.

The following additional list may be helpful in understanding the specification and claims:

In certain embodiments, a backup site—may be a facility where replicated production site data is stored; the backup site may be located in a remote site or at the same location as the production site; a backup site may be a virtual or physical site. In certain embodiments, a back-up site may be an object store.

In certain embodiments, a data center—may be a large group of networked computer servers typically used by organizations for the remote storage, processing, or distribution of large amounts of data.

In certain embodiments, a DPA—may be a Data Protection Appliance, a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

In certain embodiments, a RPA—may be replication protection appliance, which may be used interchangeable for and is another name for DPA. In certain embodiments, a RPA may be a virtual DPA or a physical DPA.

In certain embodiments, a host—may be at least one computer or networks of computers that runs at least one data processing application that issues I/O requests to one or more storage systems; a host is an initiator with a SAN; a host may be a virtual machine.

In certain embodiments, a host device—may be an internal interface in a host, to a logical storage unit.

In certain embodiments, an image—may be a copy of a logical storage unit at a specific point in time;

In certain embodiments, an initiator—may be a node in a SAN (Storage Area Network) that issues I/O requests;

In certain embodiments, a journal—may be a record of write transactions issued to a storage system; used to maintain a duplicate storage system, and to rollback the duplicate storage system to a previous point in time;

In certain embodiments, a logical unit—may be a logical entity provided by a storage system for accessing data from the storage system. As used herein a logical unit is used interchangeably with a logical volume;

In certain embodiments, a LUN—may be a logical unit number for identifying a logical unit; may also refer to one or more virtual disks or virtual LUNs, which may correspond to one or more Virtual Machines. As used herein, LUN and LU may be used interchangeably to refer to a LU.

In certain embodiments, management and deployment tools—may provide the means to deploy, control and manage the RP solution through the virtual environment management tools.

In certain embodiments, a physical storage unit—may be a physical entity, such as a disk or an array of disks, for storing data in storage locations that can be accessed by address, where physical storage unit is used interchangeably with physical volume.

In certain embodiments, a production site—may be a facility where one or more host computers run data processing applications that write data to a storage system and read data from the storage system; may be a virtual or physical site.

In certain embodiments, a SAN—may be a storage area network of nodes that send and receive I/O and other requests, each node in the network being an initiator or a target, or both an initiator and a target.

In certain embodiments, a source side—may be a transmitter of data within a data replication workflow, during normal operation a production site is the source side; and during data recovery a backup site is the source side; may be a virtual or physical site.

In certain embodiments, a snapshot—may refer to differential representations of an image, i.e. the snapshot may have pointers to the original volume, and may point to log volumes for changed locations. Snapshots may be combined into a snapshot array, which may represent different images over a time period.

In certain embodiments, a storage system—may be a SAN entity that provides multiple logical units for access by multiple SAN initiators.

In certain embodiments, a target—may be a node in a SAN that replies to I/O requests.

In certain embodiments, a target side—may be a receiver of data within a data replication workflow; during normal operation a back site is the target side, and during data recovery a production site is the target side; may be a virtual or physical site; a target site may be referred to herein as a replication site.

In certain embodiments, a WAN—may be a wide area network that connects local networks and enables them to communicate with one another, such as the Internet.

In certain embodiments, a virtual volume—may be a volume which is exposed to host by a virtualization layer, the virtual volume may be spanned across more than one site and or volumes.

In certain embodiments, a volume—may be an identifiable unit of data storage, either physical or virtual; that is, a volume can be a removable hard disk, but is not limited as being a unit that can be physically removed from a computer or storage system.

In certain embodiments, a VASA: may be a set of vCenter providers that allow an administrator to manage storage, or may include vSphere Storage application program interfaces (APIs) for Storage Awareness.

In certain embodiments, a VMFS: may be a virtual machine file system, a file system provided by VMware for storing a virtual machine.

In certain embodiments, a VMDK: may be a virtual machine disk file containing a disk data in a VMFS. Analog to a LUN in a block storage array.

In certain embodiments, a Virtual RPA (vRPAY Virtual DPA (vDPA): may be a DPA running in a VM or may be a virtualized appliance.

In certain embodiments, CDP: Continuous Data Protection, may refer to a full replica of a volume or a set of volumes along with a journal which allows any point in time access, the CDP copy is at the same site, and maybe the same storage army of the production site.

In certain embodiments, CRR: Continuous Remote Replica may refer to a full replica of a volume or a set of volumes along with a journal which allows any point in time access at a site remote to the production volume and on a separate storage array.

Referring to the example embodiment shown in FIG. 1, a data protection system 100 may include two sites, Site I 100*a* and Site II 100*b*, which communicate via a wide area network (WAN) 128, such as the Internet. In some embodiments, under normal operation, Site I 100*a* may correspond to a source site (i.e., the transmitter within a data replication workflow) of system 100 and Site II 100*b* may be a target site (i.e., the receiver within a data replication workflow) of data protection system 100. Thus, in some embodiments, during normal operations, the direction of replicated data flow may be from Site I 100*a* to Site II 100*b*, but this is not limiting. For example, it is possible, for a user or other entity (e.g., automated control) to reverse the direction of replicate data flow, in which case Site I starts to behave as a target backup site; and Site II starts to behave as a source production site. Such change of replication direction is referred to as a "failover". In some data architectures, Site I or Site II behaves as a production site for a portion of stored data, and behaves simultaneously as a backup site for another portion of stored data. In some data architectures, a portion of stored data is replicated to a backup site, and another portion is not.

In certain embodiments, Site I 100*a* and Site II 100*b* may be remote from one another. In other embodiments, Site I 100*a* and Site II 100*b* may be local to one another and may be connected via a local area network (IAN). In some embodiments, local data protection may have the advantage of minimizing data lag between target and source, and remote data protection may have the advantage of being robust in the event that a disaster occurs at the source site.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

In particular embodiments, data protection system 100 may include a failover mode of operation, wherein the direction of replicated data flow is reversed. In particular, in some embodiments, Site I 100*a* may behave as a target site and Site II 100*b* may behave as a source site. In some embodiments, failover may be triggered manually (e.g., by a user) or automatically. In some embodiments, failover may be performed in the event of a disaster at Site I 100*a*. In some embodiments, especially as described further herein, failover may be performed automatically and/or manually in advance of or in anticipation of a disaster or adverse event at any site, such as Site I 100*a*. In some embodiments, failover may be performed automatically and/or manually at any time prior to completion of an adverse event (e.g., in advance of the adverse event, substantially contemporaneously with the adverse event, at the same time as at least a portion of the adverse event, etc.). In some embodiments, especially as described further herein, after failover, restoration of operations (e.g., failback) can occur to bring the system 100 back to a condition wherein Site I 100*a* is back to being a source site and Site II 100*b* is back to being a target site. In some embodiments, both Site I 100*a* and Site II 100*b* may behave as source site for some stored data and may behave simultaneously as a target site for other stored data In certain embodiments, a portion of stored data may be replicated from one site to the other, and another portion may not be replicated.

In some embodiments, Site I 100*a* corresponds to a production site (e.g., a facility where one or more hosts nm data processing applications that write data to a storage system and read data from the storage system) and Site II 100*b* corresponds to a backup or replica site (e.g., a facility where replicated production site data is stored). Thus, in some embodiments, Site II 100*b* may be responsible for replicating production site data and may enable rollback of data of Site I 100*a* to an earlier point in time. In some embodiments, rollback may be used in the event of data corruption or a disaster, or alternatively in order to view or to access data from an earlier point in time.

Some described embodiments of Site I 100*a* may include a source host 104, a source storage system (or "storage array") 108, and a source data protection appliance (DPA) 112 coupled via a first storage area network (SAN). Similarly, in some embodiments, Site II 100*b* may include a target host 116, a target storage system 120, and a target DPA 124 coupled via a second SAN. In some embodiments, each SAN may include one or more devices (or "nodes") that may be designated an "initiator," a "target", or both. For example, in some embodiments, the first SAN may include a first fiber channel switch 148 and the second SAN may include a second fiber channel switch 168. In some embodiments, communication links between each host 104 and 116 and its corresponding storage system 108 and 120 may be any appropriate medium suitable for data transfer, such as fiber communication channel links. In some embodiments, a host communicates with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

In some embodiments, each storage system 108 and 120 may include storage devices for storing data, such as disks or arrays of disks, each of which may include a plurality of volumes. Typically, storage systems 108 and 120 may be target nodes. In some embodiments, in order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. In some embodiments, an LU is a logical entity (e.g., a logical volume) provided by a storage system for accessing data stored therein. In some embodiments, a logical unit may be a physical logical unit or a virtual logical unit. In some embodiments, a logical unit may be identified by a unique logical unit number (LUN).

In the embodiment shown in FIG. 1, storage system 108 may expose logical unit 136, designated as LU A, and storage system 120 exposes logical unit 156, designated as LU B. In some embodiments, LU B 156 may be used for replicating LU A 136. As such, LU B 156 may be generated as a copy of LU A 136. In one embodiment, LU B 156 may be configured so that its size is identical to the size of LU A 136.

As shown in FIG. 1, in some embodiments, source host 104 may generate a host device 140 ("Device A") corresponding to LU A 136 and source host 116 may generate a host device 160 ("Device B") corresponding to LU B 156. In some embodiments, a host device may be a logical entity within a host through which the host may access an LU. In some embodiments, an operating system of a host may generate a host device for each LU exposed by the storage system in the host SAN.

In some embodiments, source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

In some embodiments, source DPA 112 and target DPA 124 may perform various data protection services, such as data replication of a storage system, and journaling of I/O requests issued by hosts 104 and/or 116. When acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. In some embodiments, use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (PC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. In some embodiments, the DPA cluster leader may coordinate between the computers in the cluster, and may also perform other tasks that require coordination between the computers, such as load balancing.

In certain embodiments, a DPA may be a standalone device integrated within a SAN. Alternatively, in some embodiments, a DPA may be integrated into storage system. In some embodiments, the DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, the DPAs may issue I/O requests using, for example, SCSI commands, to access LUs on their respective storage systems. In some embodiments, each DPA may also be configured with the necessary functionality to act as targets, e.g., to reply to I/O requests, such as SCSI commands, issued by other initiators in the SAN, including their respective hosts. In some embodiments, being target nodes, the DPAs may dynamically expose or remove one or more LUs. As described herein, in some embodiments, Site I 100a and Site II 100b may each behave simultaneously as a production site and a backup site for different logical units. As such, in some embodiments, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. In some embodiments, protection agents 144 and 164 may be intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands, differently, according to the type of the command. For example, in some embodiments, a SCSI command inquiring about the size of a certain LU may be sent directly to that LU, whereas a SCSI write command may be split and sent first to a DPA within the host's site.

In some embodiments, a protection agent may change its behavior for handling SCSI commands, for example as a result of an instruction received from the DPA. For example, in some embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. Similarly, in some embodiments, when a DPA behaves as a target device for a certain LU, then during normal course of operation, the associated protection agent fails I/O requests issued by host to the host device corresponding to that LU.

In some embodiments, communication between protection agents 144 and 164 and a respective DPA 112 and 124 may use any protocol suitable for data transfer within a SAN, such as fiber channel, SCSI over fiber channel, or other protocols. In some embodiments, the communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
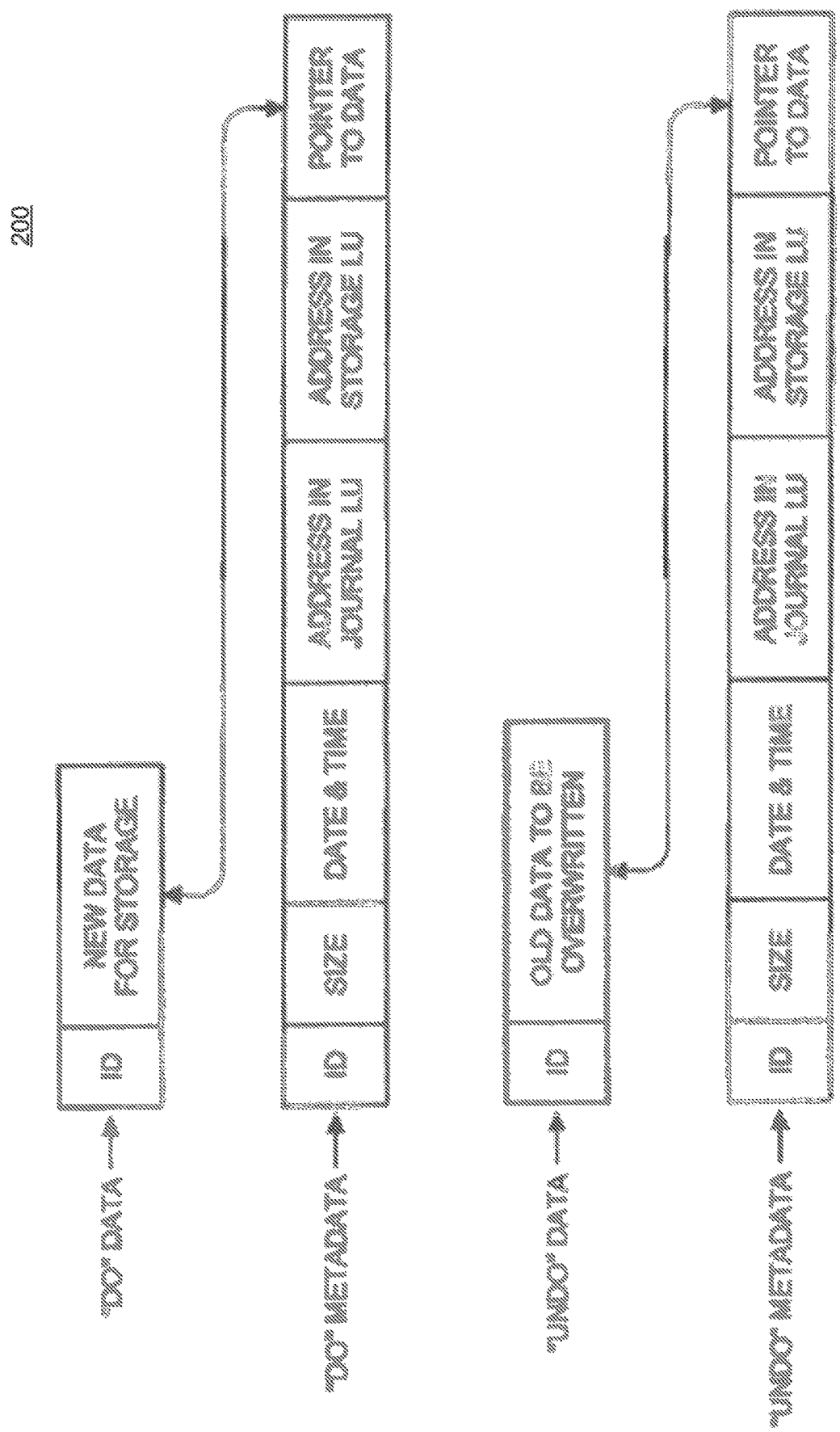
FIG. 2 is a simplified diagram illustrating a journal history of write transactions for the data protection system of FIG. 1, in accordance with at least one illustrative embodiment of the instant disclosure.

As shown in the example embodiment shown in FIG. 1, target storage system 120 may expose a journal LU 176 for maintaining a history of write transactions made to LU B 156, referred to herein as a "journal." In some embodiments, a journal may be used to provide access to storage at specified points-in-time (PITs), as discussed in greater detail in regard to FIG. 2. In some embodiments, the journal may be stored across multiple LUs (e.g., using striping, etc.). In some embodiments, target DPA 124 may include a journal processor 180 for managing the journal within journal LU 176. In some embodiments, journal processor 180 may manage the journal entries of LU B 156. Specifically, in some embodiments, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal In one embodiment, journal processor 180 may perform processing such as described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference. Other embodiments may not employ thin devices and tracking regions for replication, and may instead replicate write transactions using an array's native snapshot capabilities.

Some embodiments of data protection system 100 may be provided as physical systems for the replication of physical LUs, or as virtual systems for the replication of virtual LUs. For example, in one embodiment, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, in normal operation (sometimes referred to as "production mode"), DPA 112 may act as a source DPA for LU A 136. This, in some embodiments, protection agent 144 may act as a source protection agent, specifically by splitting I/O requests to host device 140 ("Device A"). In some embodiments, protection agent 144 may send an I/O request to source DPA 112 and, after receiving an acknowledgement from source DPA 112, may send the I/O request to LU A 136. In some embodiments, after receiving an acknowledgement from storage system 108, host 104 may acknowledge that the I/O request has successfully completed.

In some embodiments, when source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. In some embodiments, when applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In some embodiments, in synchronous mode, source DPA 112 may send each write transaction to target DPA 124, may receive back an acknowledgement from the target DPA 124, and in turn may send an acknowledgement back to protection agent 144. In some embodiments, in synchronous mode, protection agent 144 may wait until receipt of such acknowledgement before sending the I/O request to LU 136.

In some embodiments, in asynchronous mode, source DPA 112 may send an acknowledgement to protection agent 144 upon receipt of each I/O request, before receiving an acknowledgement back from target DPA 124.

In some embodiments, in snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. In some embodiments, in snapshot mode, source DPA 112 may send an acknowledgement to protection agent 144 upon receipt of each I/O request, before receiving an acknowledgement back from target DPA 124.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

As described herein, in some embodiments, in normal operation, LU B 156 may be used as a backup of LU A 136. As such, while data written to LU A 136 by host 104 is replicated from LU A 136 to LU B 156, target host 116 should not send I/O requests to LU B 156. In some embodiments, to prevent such I/O requests from being sent, protection agent 164 may act as a target site protection agent for host device B 160 and may fail I/O requests sent from host 116 to LU B 156 through host device B 160. In some embodiments, in a recovery mode, target DPA 124 may undo the write transactions in journal LU 176 so as to restore the target storage system 120 to an earlier state.

Referring to FIG. 2, in some described embodiments, a write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, in some embodiments, transaction 200 may correspond to a transaction transmitted from source DPA 112 to target DPA 124. In some embodiments, target DPA 124 may record write transaction 200 in the journal that includes four streams. In some embodiments, a first stream, referred to as a "DO" stream, includes a copy of the new data for writing to LU B 156. In some embodiments, a second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. In some embodiments, a third stream, referred to as an "UNDO" stream, includes a copy of the data being overwritten within LU B 156 (referred to herein as the "old" data). In some embodiments, a fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

In some embodiments, since the journal contains the "undo" information necessary to rollback storage system 120, data that was stored in specific memory locations at a specified point in time may be obtained by undoing write transactions that occurred subsequent to such point in time (PIT).

In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. In some embodiments, validating data replicas can be important, for example, in data replication systems employing incremental backup where an undetected error in an earlier data replica may lead to corruption of future data replicas.

Having described a data protection system and journal history configuration in which at least some embodiments (especially those described herein in FIGS. 3-6B) may be embodied, further details of at least some embodiments related to additional data protection will now be described. Although the following disclosure and example embodiments are described in connection with their use with backup sites, data centers, DPAs, RPAs, hosts, data centers, SANs, LUNs, etc., it will be appreciated that the disclosures and embodiments herein are not limited to these applications, but can find applicability in virtually any type of system subject to losses or downtime as a result of disasters and/or adverse events.

Data intensive system installations in general and cloud-based installations in particular are susceptible to outages due to failures in infrastructure—power, network, cooling, physical premises etc. These outages can be temporary, where the system needs to restart after an event, or can result in corruption or loss of data or equipment, which may result in longer outages or complete failures. In addition, these outages can occur as a result of unplanned natural events (e.g., those resulting from weather, environmental, geological, etc.), unplanned events or conditions such as equipment failure and/or degradation, power outage and/or insufficiency; communications outage and/or insufficiency; and also as a result of human induced events, including but not limited to those that are intentionally induced (e.g., planned outages, malware, hacking, vandalism, acts of war or terrorism, riots) and unintentionally induced (e.g., vehicular accidents, construction accidents, incorrect operation or configuration of equipment, etc.).

As a result, at least some data protection products, such as those described herein, are employed to provide redundancy of computing, network and storage and help secure protection of data and/or continuous operation, even when such events occur. These products include, but are not limited to, products providing backup, replication, distributed storages, geo-located caches, active-active availability mechanisms, and redundancy in almost all components of a data system. However, at last some of these mechanisms need some management of their operations. For example, backup systems often create backups on a schedule (daily, weekly etc.), replication systems need to know when to failover or restore and so on. In event of a significant disaster (a data center that is flooded, for example) the recovery operations can be many and diverse. After or during a disaster or other significant event, data at a new (or rehabilitated location) may need to be restored from backups or replication data.

For at least some types of disasters, at the time that the disaster strikes, it is likely that downtime already occurred, and the rapid return to operations generally involves some data loss. With at last some known data protection systems, once it is learned that a disaster or other negative event has occurred or is occurring, operations to prevent data loss and/or computer downtime are done manually, reactively, and after the event has occurred, which can cause downtime and data loss. Thus, it is advantageous if a data protection system is able proactively to reduce the downtime and data loss of a data center on a disaster event by implementing protective processes in advance of disasters or negative events. It is even more advantageous if a data system is able to predict likelihood or risk of one or more types of events such as disasters or other events that can cause data loss, so as to implement proactive strategies before a disaster or other event occurs.

As described further herein, in at least some embodiments, a statistical "big data" analytics system is used to help predict disasters and other events that could impact a data center and to adjust data protection and data center configuration accordingly. In at least some embodiments, the statistical big data analytics system scans many data resources and provides a risk value for different disasters. In at least some embodiments, using these risk values, the data center operations automatically will adjust the systems to avoid downtime, or at the very least provide the administrator and alert to allow him to adjust the system.

Figure 3:
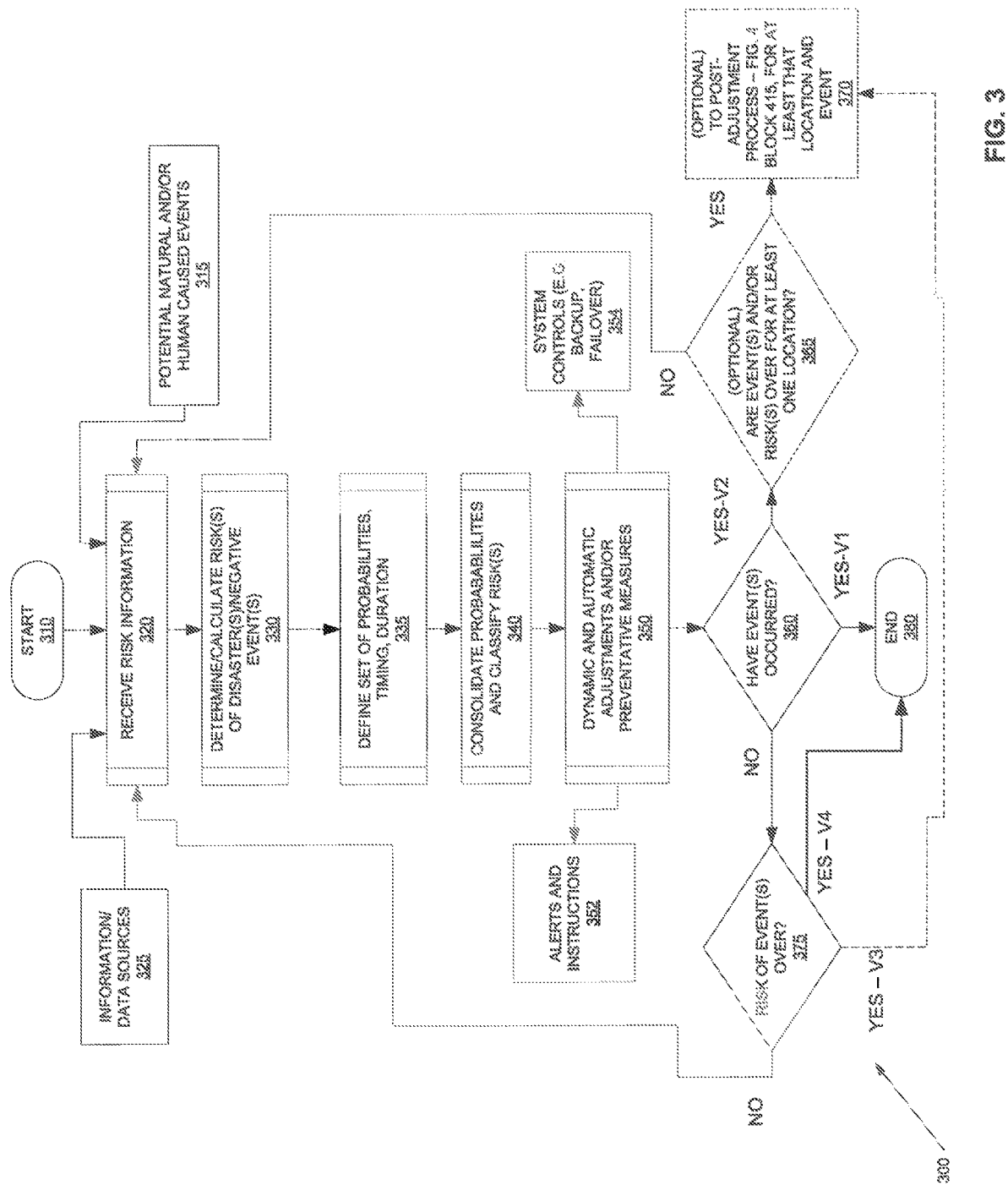
FIG. 3 is a simplified flowchart of a first method of preventative data protection, in accordance with at least one illustrative embodiment of the instant disclosure.

FIG. 3 is a simplified flowchart of a first method 300 of preventative data protection, in accordance with at least one illustrative embodiment of the instant disclosure. In at least some embodiments, the method 300 of FIG. 3 is a computer-implemented method performed by one or more computer systems (e.g., hosts) that are not subject to the predicted, imminent, or current disaster(s) or adverse event(s). In at least some embodiments, the method 300 of FIG. 3 is a computer-implemented method 300 that is performed at least partially by one or more computer systems that may be subject to the predicted, imminent, or current disaster or adverse event, and are performed as much as is possible prior to and/or during the disaster or adverse event. In at least some embodiments, the method 300 of FIG. 3 can be performed by an external system (e.g., a management or monitoring type of system, or any system configured to have management or monitoring capabilities). Referring again to FIG. 3, at the start (block 310), risk related information is retrieved (e.g., by querying one or more data sources) and/or received (e.g., by receiving information that could be related to a risk, whether directly or indirectly) (block 320) from one or more data sources. This information and data sources (blocks 315 and 325) includes virtually any type of information from any source anywhere in the world, relating to any event whether natural or human caused, including but not limited to:

Direct communications received from outside entities;
emergency systems and alerts;
government sources and information (including but not limited to databases, websites, documents, press releases, etc.);
news sources (including but not limited to online news websites, cable television broadcasts, radio, satellite, and television broadcasts, etc.);
alerts (both official and unofficial) from any source;
social media (including but not limited to social media sites such as FACEBOOK, TWITTER, INSTAGRAM, YOUTUBE, TUMBLR, GOOGLE+, LINKEDIN, FLICKR, REDDIT, QUORA, etc.);

websites, web searches, newsfeeds, RSS feeds, etc.

information from sensors and/or other data gathering devices or entities capable of acquiring information that, by itself or in combination with other information, may be usable to determine risk of a negative event;

traffic and transportation information;

messaging systems (including but not limited to text messaging, instant messaging, social media messaging, etc.);

data sources (including but not limited to almanacs, historical weather, climate, and/or environmental information; archived news, weather, and other information, etc.);

weather satellites and/or any other climate or weather tracking systems and devices;

sensors, sonar systems, radar systems, and/or cameras (including but not limited to those configured to monitor traffic, municipal locations, private locations, predefined areas, etc., whether coupled to fixed or moving locations, such on drones, on webcams, on wearable cameras or sensors, etc.)

historical information in any form;

security assessments of networks and/or computers (including but not limited to those provided by governments, militaries, private agencies, private companies, etc.); and data center operational information (including but not limited to real-time data related to environmental conditions; operational history; maintenance, inspection, repair and test of any part of the data center, and sociological, and other conditions at or near any data center or computer system being protected and/or monitored.

The above examples are not exhaustive or limiting and are provided merely as illustrative example showing the wide variety of sources of information that can be usable, either individually or in combination with other information sources, to help determine a risk of a disaster or other negative event. The information can be configured to be automatically received or retrieved and stored in a predetermined storage location, for later data analysis and/or data mining, whether at predetermined intervals, in real time, at a later time, or some combination. In some embodiments, the rate of update of information is at least partially dependent on the type of the information being updated. For example, data center status can be continuous and immediate. Weather updates can be periodic (except in the case of unforeseen emergencies, e.g., a flash flood warning, tornado warning, etc.). Alerts can be event based. In some embodiments, the information is retrieved and/or received at predetermined intervals. In some embodiments, the information is retrieved and/or received substantially continuously. In some embodiments, the data analysis and data mining occur substantially continuously, as data becomes available. In some embodiments, the data mining and data analysis occur substantially contemporaneously with when data is made available. In some embodiments, the data mining and data analysis occur some predetermined time after data becomes available. In some embodiments, the information is received and/or retrieved (block 320) in advance of the disaster or adverse event. In some embodiments, the information is received and/or retrieved (block 320) at substantially the same time that the adverse event or disaster is occurring. As will be appreciated, data mining sometimes uses databases that are too big to transfer. Instead of retrieving the data, a query/search/operation/program is sent to the data source and only the results transferred back. That means, in some embodiments, that the data acquisition method is up to the service being used, and the result is provided ad hoc.

For example, an adverse event could be already occurring at a first location, but the method of FIG. 3 can determine that its impact is more significant than first expected at that first location (e.g., more effects than expected on a given data center or other entity (blocks 335, 340), and/or that a given adverse event or disaster, which is already having an effect a first location, may subsequently be having or causing additional effects at other locations (including but not limited to locations in operable communication with and/or dependent on the first location).

As will be appreciated, the disclosures and embodiments made herein likewise will be usable with newly developed sources of data and information, new social media sources, new systems for broadcasting information and sending messages, new types of websites, new systems for gathering and communicating information, etc. In addition, as will be appreciated, there are many types of disasters, negative events, or potential sources of disruption to data mine. Negative events such as disasters can be of a global or wide nature like earthquakes, hurricanes and flooding or more local like fires, power outages or civil unrest, can be accidental or deliberate, and can arise from uncontrollable or controllable events, be the originating from actions or humans or not.

Referring again to FIG. 3, at least a portion of the retrieved and/or received risk information is used to determine or calculate a risk of a disaster or negative event (block 330), such as whether one or more adverse events could occur at or near a given data center location (or other location of interest, such as a backup site, sites where a host, DPA, RPA, SAN, LUN, production site, source side, storage system, WAN, or any other device or system of interest is located (i.e., any entity disposed at, operating at, or otherwise associated with a location, where the entity is intended, in at least some embodiments, to cover any non-human, non-animal apparatus, method, article of manufacture, process, or system operating at least partially at a given location). In at least some embodiments, it is envisioned that at least some embodiments described herein also are usable to predict and respond to adverse events that at least partially affect entities other than apparatuses, methods, articles of manufacture, processes, and/or systems—for example, to determine risks of adverse actions that could affect real estate, buildings, humans, animal, plants, etc., and/or to implement automatic adjustments and/or preventative and/or protective measures to preserve real property and buildings, as well as human, animal, and/or plant life. In at least some embodiments, the risk includes a future risk. In at least some embodiments, the risk includes a real-time risk (i.e., a risk that is happening at substantially the same time that the data is being retrieved and/or received about it). Based at least in part on the received risk information (block 320) and determination of risk (block 330), a set of probabilities is generated (block 335), wherein in at least some embodiments, this also includes determining the expected time (e.g., of arrival) and duration or length, of each disaster or negative event.

Figure 5A:
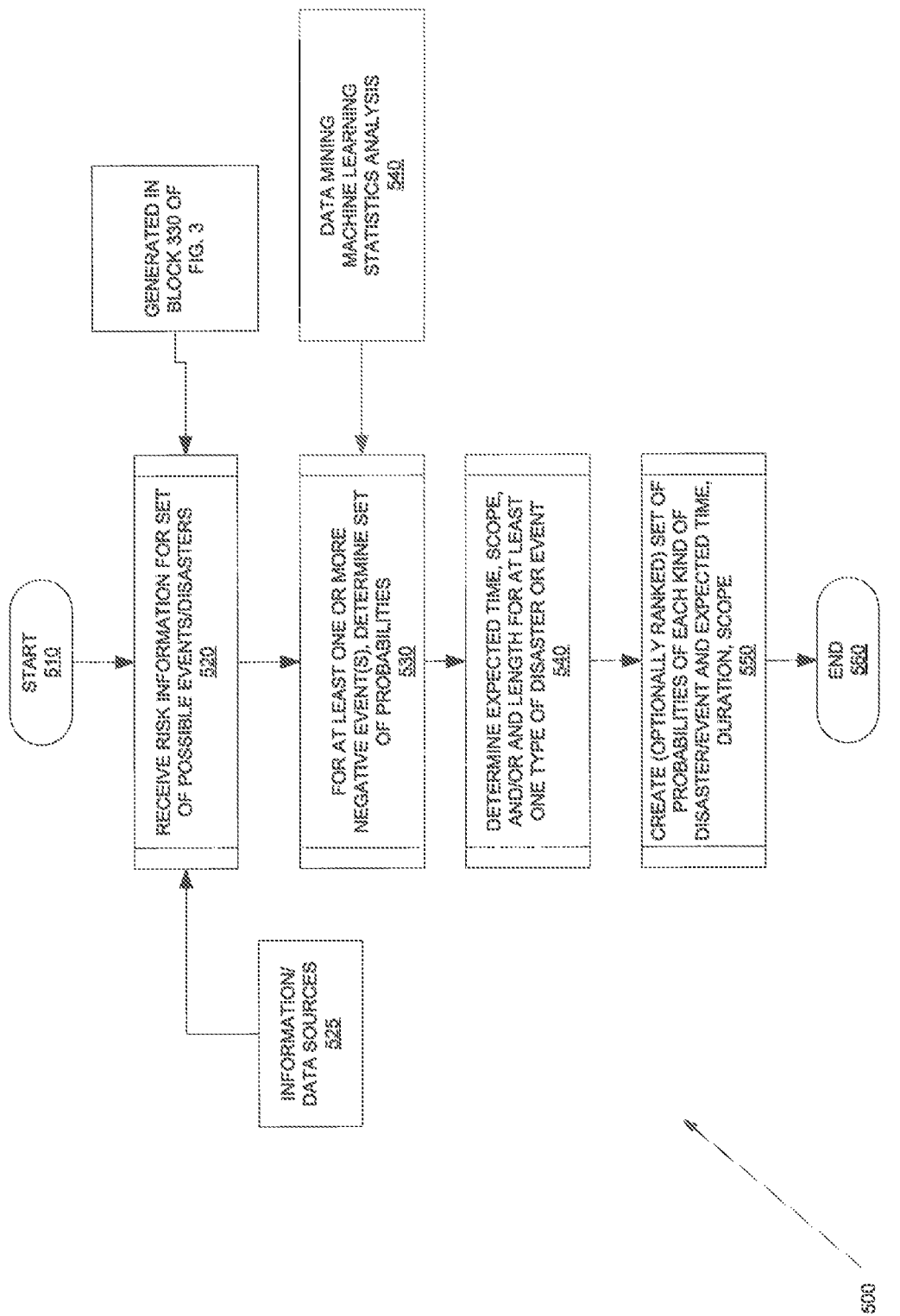
FIG. 5A is a simplified flowchart of a method of generating a set of probabilities of one or more adverse events based on information relating to event risks, in accordance with at least one illustrative embodiment of the instant disclosure.

Referring briefly to FIG. 5A, FIG. 5A is a simplified flowchart of a method of generating a set of probabilities 500 of one or adverse events based on information relating to event risks, in accordance with at least one illustrative embodiment of the instant disclosure. The adverse events can affect any entity associated with a given location, including entities actually located at the location, entities in operable communication with other entities operating at the location, entities not disposed at a location but which may depend on and/or require use of a given location (or any entity operating thereon) as part of their operation, etc. Referring to FIGS. 3 and 5A, once risk information is received (blocks 320, 520) various techniques are usable, in various embodiments, to calculate risk. In at some embodiments, data mining (block 540) is employed as part of the risk calculation. Data mining, in some embodiments, refers to the process of identifying useful patterns or relationships in databases or other computer-readable repositories or sources of information, generally through use of advanced statistical tools. For example, in some embodiments, a data-mining algorithm is used to determine risks based on the received information from block 325, where the data-mining algorithm can, in at least some embodiments, employ statistical means and also machine learning to improve its accuracy over time (block 540).

In some embodiments, a data mining algorithm is a well-defined procedure that takes data as input and produces models or patterns as output. Illustrative examples of usable data mining algorithms and products include, but are not limited to the k-means algorithm, the C4.5 algorithm, the Classification And Regression Trees (CART) algorithm, the OCl algorithm, K Nearest Neighbor (KNN) algorithm, Auto-Class III algorithm, the DBMiner product, and the EMERALD data mining tools, Bayesian Belief Networks (BBNs); as well as virtually any data mining or learning algorithm or product currently known or later developed, including as well as techniques such as Support vector machines, APriori, EM, PageRank, AdaBoost, Naive Bayes, and Neural Networks. This list of usable data mining algorithms is not exhaustive, and many other algorithms are usable in accordance with at least some embodiments.

In some embodiments, the risks calculated can include either or both of quantitative risks and qualitative risks. Determining quantitative risks, in at least one embodiment, can at least relate to numerically determining probabilities of one or more various unfavorable or negative events and determining a likely extent of losses if a given event or set of events takes place. Determining qualitative risks, in at least one embodiment, relates to defining, for at least one potential threat (i.e. adverse event or disaster), the extent of vulnerability existing at a given location or set of locations, as well as if any countermeasures to the negative event or disaster exist or are possible, should such a negative event occur.

The calculation of risk of block 330, in one embodiment, can assess risks that correspond to a predetermined list of possible risks that are reasonably likely or historically possible for a given location, or to non-predetermined risks that might not have been considered likely but now are viewed to be possibly more of a concern because of newly received and data mined information. The following hypothetical examples are illustrative of some of the kinds of risks that could be predicted in accordance with at least some embodiments described herein:

risk of loss of some or all of the data stored in a data center due to wind damage or flooding, from hurricane for a data center located in the vicinity of the United States southeastern Atlantic Coastline, during the hurricane season of June through November)—where data sources such as weather and environmental data sources can provide inputs;

risk of a computer outage or degradation of systems during warm months on warm areas due to a rolling power outage—where data sources such as news reports, emergency systems, messaging systems, can provide inputs; and risk of hacking, sabotage, and/or espionage for a data center storing sensitive financial or military information—where data sources such as security assessments can provide inputs.

Examples of adverse events which might not have been previously foreseen for a given location, but suddenly may become of more concern and risk, in at least some embodiments, include but are not limited to situations such as the following hypothetical examples:

risk of deliberate destruction of or interference with a data center or computer system, due to reports of increased political or civil unrest near a data center in a location that previously had no such history—where data sources such as news and media and/or social media can provide data inputs showing increased tensions or social concerns near a data center located in a geographical area of interest;

risk of a computer outage due to a fire or other damage resulting from a truck crashing into a building where computer systems are located—where data sources such as vehicle and/or building mounted cameras, new and media sources, emergency alerts, and even social media, can provide inputs relating to incidents near a host site;

risk of damage to computer systems and/or data centers due to damage caused by possible rioting or looting that might occur after a closely-watched jury decision is read or after a sporting event final playoff game takes place—where data sources such as news media, social media, messaging services, etc. even social media might provide useful inputs that such actions are being planned or actually are taking place; and risk of certain types of hacking, malware, ransomware, and/or denial of service types of attacks on computer or data center installations—where data sources such as message boards, social media, and even records of types of searches done on search engines, may provide useful information that criminals are exchanging information about planning or how to carry out such attacks on specific sites.

The above scenarios are merely exemplary and not limiting, but help to illustrate the range of activities and data that can be useful to help assess not only imminent risk of an adverse event, but also to assess future risks of one or more adverse events. The data also can be analyzed to help predict the risk of some adverse events, or bring to the attention of computer administrators adverse events that had not previously been predicted, but for which changing conditions make more likely or imminent. In addition, as will be described further herein, the risk analysis techniques described herein also can be usable in developing processes to bring systems back to normal operation after an adverse event or disaster has either occurred and is over, or even if such an adverse event or disaster was predicted or expected, but did not occur.

Referring again to FIGS. 3 and 5A, based on the received risk and calculations of risks in blocks 330/520 a set of probabilities is generated (blocks 530) for one or more of the adverse events (block 335/530, 540). In some embodiments, the set of probabilities also includes the expected time of arrival/occurrence of the adverse event, its potential scope, and/or its duration (block 540). In some embodiments, the set of probabilities is (optionally) ranked and the expected time of arrival, scope, and duration are determined for only those events deemed to have a risk probability exceeding a predetermined threshold (block 550). In some embodiments, the set of probabilities and expected time of arrival, scope, and duration are determined for all possible events.

Reference is now made briefly to FIG. 5B, which is a first simplified table showing a first illustrative set of probabilities 502 created in accordance with FIGS. 3 and 5A, in accordance with at least one illustrative embodiment of the instant disclosure, where these probabilities are for risks associated with a single data center (in the example of the table 502 of FIG. 51B, it is "EMC #1" located in Westborough MA (this example is illustrative and not limiting)). Table 502 represents, in one embodiment, a set of probabilities for various types of adverse events for a first data center, based on data mining of data source information that has been received and/or retrieved. In Table 502, although the risk ranking is shown for illustrative purposes using terms like "high" and "medium", it will be appreciated that the risk ranking also could be expressed using numerical probabilities and/or odds (e.g., 3:1, 1 in 100, 30 percent chance, etc.), or any other desired method.

In addition, FIG. 5C is a second simplified table 504 showing an illustrative set of probabilities created in accordance with FIGS. 3, 5A, and 5B, in accordance with at least one illustrative embodiment of the instant disclosure, for four exemplary data centers in several different locations. The tables of FIG. 5B and/or FIG. 5C can, in at least some embodiments, correspond to information contained data structures usable by any one or more of the methods of FIGS. 3, 4, 5A, and/or 6A described herein. For the sake of example, it is assumed that the tables 502 and 504 were generated some time in advance of the earliest date shown in the tables—e.g., assume these tables was generated on or before Jul. 14, 2016. The tables 502, 504, in some embodiments, can correspond to information stored in a computer-readable record used during the method of FIGS. 3, 4, 5A, and/or 6A. Table 502 of FIG. 5B shows illustrative examples of predicted future data events for one data center, ranked by severity; Table 504 is a similar table showing events for several data centers.

In some embodiments, a computer-implemented method is provided. First information is received from at least a first data source. Based at least in part on analysis of the received first information, a determination of a first risk of a first adverse event is made, the risk affecting a first entity associated with a first location. Based at least in part on the first risk, at least a first impact from the first adverse event on the first entity is determined. At least a first action is dynamically caused to occur before completion of the first adverse event, where the first action is configured to substantially mitigate the first impact.

In another example, table 504 of FIG. 5C shows that, after the risk calculation (blocks 330, 520) and determinations of sets or probabilities (blocks 530-550), certain types of adverse events are predicted (based on data mining the data sources) as being of moderate to high risk for the Google #1 data center in Chile. For example, historical data could show that there has been a past negative event in Chile in 2014 corresponding to an earthquake and tsunami, and seismic data from data sources likewise may indicate an increased probability of such an event in the next few days. Similarly, long range weather forecasting and historical data may indicate a medium to high probability of tornadoes for EMC data center #2 in coming weeks. Tables 502 and 504 are not intended to show all possible probabilities for all data centers, but are provided as merely illustrative in showing, via the exemplary simplified listings of the kinds of information and events that might be applicable in accordance with at least some embodiments.

Figure 6A:
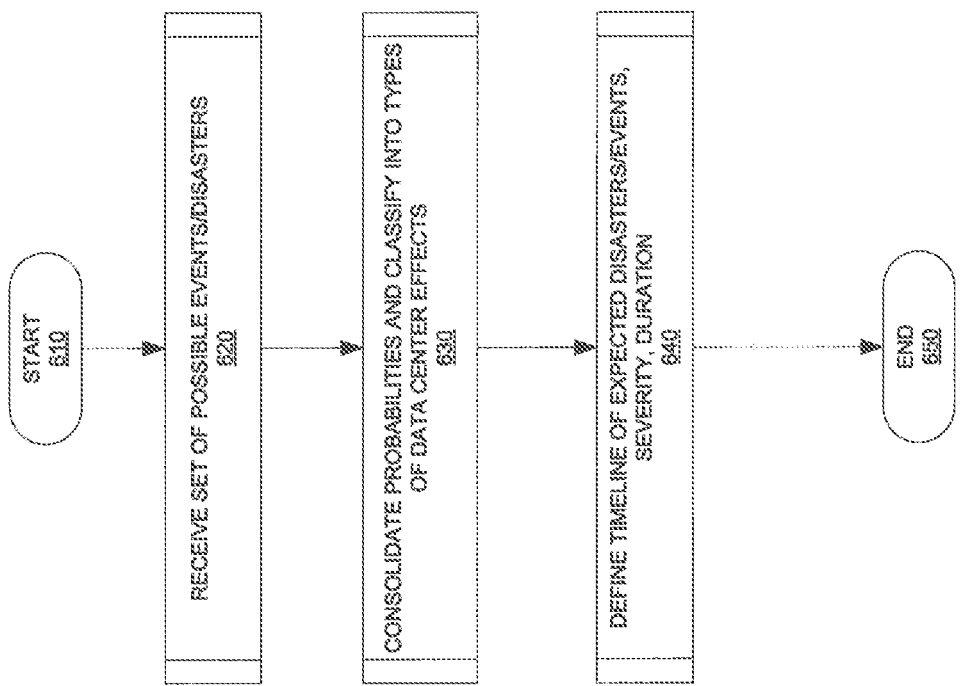
FIG. 6A is a simplified flowchart of a method of classifying event risks, in accordance with at least one illustrative embodiment of the instant disclosure.

Referring again to FIG. 3, the probabilities calculated in block 335 can then be consolidated to classify (block 340) the way such probabilities may affect the data center or any desired desires location. FIG. 6A is a simplified flowchart of a method of classifying event risks 602, in accordance with at least some illustrative embodiments of the instant disclosure. Referring to FIGS. 3, 5A, and 6A, after the set of possible probabilities of each kind of disaster/event is generated in block 550 of FIG. 5A, the set is used at block 620 of FIG. 6A to help to substantially consolidate the probabilities (block 630) and classify the events into types of data center effects, so that a timeline (block 640) of expected disasters and events can be defined or generated, advantageously including their severity, and their duration. In some embodiments, the classifications can include effects that include, but are not limited to outcomes like:

Destruction of premises;
Short power outage;
Communications Outage;
Degradation of infrastructure services;
Data center hijacking by competitor or terrorists.

In some embodiments, each type of classification is associated with one or more possible responses, where the responses generally are designed to minimize data loss and/or computer system downtime for that type of event. More than one classification may exist for a disaster type, and values can be set or defined relating to the severity/length of the expected disaster—for example, is a predicted or expected power outage expected to be short (flicker, UPS exist) versus longer, will the event or disaster result in a certain level of service degradation etc. FIG. 6B is a simplified table showing an illustrative set of classifications 602, created in accordance with FIGS. 3, 4, 5A, 5B, and 6A, in accordance with at least one illustrative embodiment of the instant disclosure. FIG. 6B can, in at least some embodiments, correspond to information contained in a data structure usable by any one or more of the methods of FIGS. 3, 4, 5A, and/or 6A described herein. As FIG. 6B shows, for the first type of data outage at EMC #1 for 10 hours, even though FIGS. 5B and 5C had shown the odds of the event happening were very high (given that the event was a planned event), the actual effect is expected to be minimal due to the presence of a backup generator. However, in contrast, for EMC#2, for the predicted event of a tornado hitting the data center in Durham, N.C., not only is the probability high (though perhaps not as high as an actual planned event), the predicted effect also might be more sever because one noted effect on the data center would be reduced staffing (and thus reduced personnel to help effect countermeasures to any predicted adverse event), as well as any likely downtime, and this affects the response, as well.

Referring again to FIG. 3, after risks are classified (block 340), one or more system behavior changes are triggered based at least in part on the classification (block 340) and the timelines associated with the set of probabilities (block 335). In some embodiments, the system behavior changes correspond to dynamic and/or automatic adjustments of system operation and/or dynamic and/or automatic implementation of preventative measures (block 350), to help minimize loss of data and/or service outages, and/or to mitigate or lessen, at least, the impact of the disaster or adverse event (e.g., to substantially minimize its impact). For example, in same embodiments, these can include pre-emptive adjustments or measures based on the classification and timeline. In some embodiments, at least same of the actions taken in blocks 350-356, in response to the classifications of block 340, are automatic types of responses (e.g., done by a processor configured to cause the action to take place, such as a processor in operable communication with a system, device, apparatus, or process affected by the adverse event or disaster. In some embodiments, at least some of the actions taken in blocks 350-356, in response to the classifications of block 340, are a mix of automated responses and instructions for manual responses. In some embodiments, at least some of the actions taken in blocks 350-356, in response to the classifications of block 340, are instructions for manual responses.

In some embodiments, the dynamic and/or automatic adjustments and/or preventative measures of blocks 350-356 can result, in some embodiments, in one or more of the following types of actions which can, in some embodiments, be accomplished at least in part using management and deployment tools used with a given production site, storage system, RPA, DPA, SAN, VASA, backup site, host, production site, data storage center, etc.:

causing or generating one or more communications causing system controls (block 356) to cause certain system actions to occur in one or more systems (as described more fully herein), such as creating a clone (e.g., a copy of an image or images, drive or drive of a first location at a second location), creating an image or snapshot, replicating/duplicating, stopping or starting CDP or CRR, failover, backup, etc.;

causing or generating one or more types of failover operations (block 356), as described further herein;

causing or generating one or more alerts and/or instructions related to the adjustments and/or measures, such as alerts and/or instructions both to human and non-human entities (e.g., alerts and/or instructions to computer administrators, alerts and/or sets of instructions, automatically sent to computer systems, etc.) (block 352);

connecting, whether manually or automatically one or more backup types of systems to the system under risk, including but not limited to backup generators, backup power supplies, backup storage systems, etc.

As will be appreciated, in some embodiments, the countermeasures and other adjustments and/or preventative measures being taken depend at least in part on the type of disaster or adverse event that is predicted or occurring, its duration, and what type of functionality or system is attempting to be preserved. Thus, the above examples are not exhaustive.

For predicted or imminent destruction of premises, in some embodiments, the countermeasures are used to provide alerts and warnings as early as possible to preserve human life, generate control signals configured to instruct systems to back up all data, generate instructions to move resources away from the premises, if possible (e.g., failover), disconnect resources from power to avoid electrocution and/or shock, possible encryption or destruction of sensitive data to prevent its becoming accessible to inappropriate or criminal users. For example, in some embodiments, in the situation of predicted or imminent destruction of premises, the goal is to get everything possible out of those premises: mass migration of applications to other data centers; transfer of data, copies, and replicas to other locations; and any other possible actions usable to get a given data center premises as empty as possible. As will be appreciated, options such as destruction or deletion of data is a type of a security measure, as it is assumed that in the event of significant destruction of premises, that unauthorized third parties will have physical access to some of the media, and to the extent possible it is advantageous to ensure access security. In another example, at least some embodiments as described herein can be used in combination with other types of systems that automatically protect data during disasters, as will be understood.

For predicted or imminent power outages of various durations, in accordance with some embodiments (blocks 350-356), responses include, but are not limited to: use of uninterruptible power supplies; use of backup generators, offloading information to remote data centers or targets not affected by the predicted or imminent disaster, front-loading backup and/or replication operations to make use of available time, shut-down on essential functions or equipment, maximize power management features, use a predetermined and/or dynamically created priority list to maintain power to the highest priority resources first, etc.

For predicted or imminent communications outages and/or degradation, in accordance with some embodiments, actions (blocks 350-356) could include thing like proactively using multiple redundant computer links and/or network paths to ensure critical and/or high priority data is offloaded, degrade different computer systems and/or paths based on predetermined and/or dynamically created priority lists, etc.

For predicted or imminent degradation of infrastructure services, in at least some embodiments, including but not limited to high load on central processor unit (CPU), strain on communication bandwidth, strain on HVAC systems (e.g., due to extreme heat or extreme cold), humidity issues, plumbing issues, loss of capacity due to equipment failures, and/or any other conditions causing less than full performance of existing systems, etc., actions can be taken (blocks 350-356) to optimize system performance. For example, in some embodiments, for predicted or imminent degradation of CPU/communications, actions that can be taken include, but are not limited to, shutting down lower priority systems, stopping all non-essential operations like: upgrades, maintenance operations, non-essential data transfers, backups. For predicted or imminent degradation of air-conditioning or environmental issues, actions that can be taken include, but are not limited to, slowing down CPU clocks, stopping spinning disks that are not immediately needed, shutting of switches, uniting virtual machines on fewer hypervisors and shutting the free hypervisors off.

For predicted or imminent outages due to hijacking (e.g., by competitor or terrorists) or other predicted or imminent criminal acts (e.g., potential theft of digital information), in at least some embodiments, if any knowledge about potential targets is known, actions (blocks 250-356) can include shutting down such targets and/or segregating them to be subject to minimal negative consequences during such adverse events. Additional activities and actions in accordance with blocks 350-356 could include, in some embodiments, proactively configuring systems to be ready of potential attacks, both physical and non-physical (e.g., via malware, hacking, denial of service, etc.)—such proactive configuring could include updating all virus protections, configuring systems to block communications, additional encrypting of information to block access, digitally watermarking information to help make changes apparent and to make apparent to others that data has been stolen, etc.

The following are illustrative examples of adjustments (blocks 350-356) usable in certain exemplary hypothetical scenarios, in accordance with at least some embodiments, but these are not to be construed as limiting:

First Example—Expected Immediate Disaster, Short Power Loss: Actions in Some Embodiments May Include, but are not Limited to a. Flush all caches.
b. Take snapshots (e.g., of storage arrays) if fast enough (e.g., in seconds or sub-seconds).
c. Live migrate to other sites (including failover sites) if possible (or use any other technique capable of allowing live migration of a running virtual machine's (VM) file system from one storage system to another, with no downtime for the VM or service disruption for end users.
d. Shorten recovery point objective (RPO) (i.e., maximum targeted period in which data might be lost from an IT service due to a major incident), where possible, such as by buffering some data and sending it in bulk.

Second Example—Expected Destruction by Hurricane, Two Days Off—Actions in Some Embodiments May Include, but are not Limited to a. Refresh backups to whatever possible and ship off premise.
b. Failover replication systems to other sites.
c. Live migrate to other sites if possible.
d. Create new copies on other sites and transfer to them
e. Prioritize the operations according to SLA, and resources available.

Third Example—Hijacking, 1 HOUR—Actions in Some Embodiments May Include, but are not Limited to a. Flush caches.
b. Copy data off site.
c. Encrypt/delete data—sensitive data first.
d. Change passwords and/or encryption key Referring again to FIG. 3. in some embodiments, after the dynamic and automatic adjustments are made (block 350), if the adverse event(s) or disaster(s) have occurred, in some embodiments, processing ends (i.e., the YES—V1 outcome at block 360, leading to block 380). In some embodiments (i.e., the YES—V2 outcome at block 360), even if the adverse event has occurred, if the risk of additional adverse events or disasters has not ended (i.e., the NO outcome at block 365), continual checks are made (e.g., by repeating blocks 320-356) to see if new and/or updated risk information is received, and, based on the new and/or updated information, risks are r-evaluated, as noted above, and new or modified adjustments and/or preventative measures are implemented, based on predicted and/or actual adverse event(s) and/or disaster(s). For example, in some embodiments, the continual checks can be periodic or event based (e.g., new data triggers new evaluation); continual checks also are advantageous in some embodiments because the monitoring system or device also needs to know when events passed to return to normal. Continual chocks also are useful, in some embodiments, if there is more than one disaster at a given time. In some embodiments, at block 365, if the risk of adverse events or disasters has passed, at least for a given data center (i.e., the YES outcome at block 365), in some optional embodiments, a post event process is performed (see block 370 and FIG. 4, described further herein) to attempt to restore at least some systems (which have been subject to adjustments and/or preventative measures) substantially back to original configuration, if possible.

Referring again to decision block 360 of FIG. 3. in some embodiments, after the dynamic and automatic adjustments are made (block 350), if the adverse event(s) or disaster(s) have not yet occurred (i.e., the NO outcome at decision block 360), a determination is made (decision block 375) about whether the risk of one or more adverse events or disasters has ended, at least for one or more locations being monitored. If the risk has not ended (i.e., a NO outcome at decision block 375), continual checks are made (e.g., by repeating blocks 320-356) to see if new and/or updated risk information is received, and, based on the new and/or updated information, risks are re-evaluated, as noted above, and new or modified adjustments and/or preventative measures are implemented, based on predicted and/or actual adverse event(s) and/or disaster(s) (blocks 350-356).

In some embodiments, at decision block 375, if the outcome is YES (i.e., that the risk of an adverse event or disaster has ended, at least for some locations being monitored), then, in accordance with some embodiments, several options are possible. In some embodiments (i.e., the YES—V3 outcome at block 375), processing ends (block 380). This YES—V3 outcome can be applicable, in at least some embodiments, where the scope of the adjustments and preventative measures done in blocks 350-356 are of a nature that do not require significant reversing types of actions to restore normal operation, and/or if reversal might not be feasible. For example, if the actions done in blocks 350-356 involved actions like refreshing backups and creating extra copies, there may be little to no action needed to bring the affected devices to normal operation (indeed, some of these devices may never have deviated from normal operation). In some embodiments, however, the actions done in blocks 350-356 may necessitate some additional actions (whether performed automatically or manually) to restore one or more systems at a given location back to normal operation (e.g., if data was encrypted, or devices were shut down, or components were taken offline, etc.). This corresponds, in some embodiments, to the YES—V4 outcome at block 375.

Figure 4:
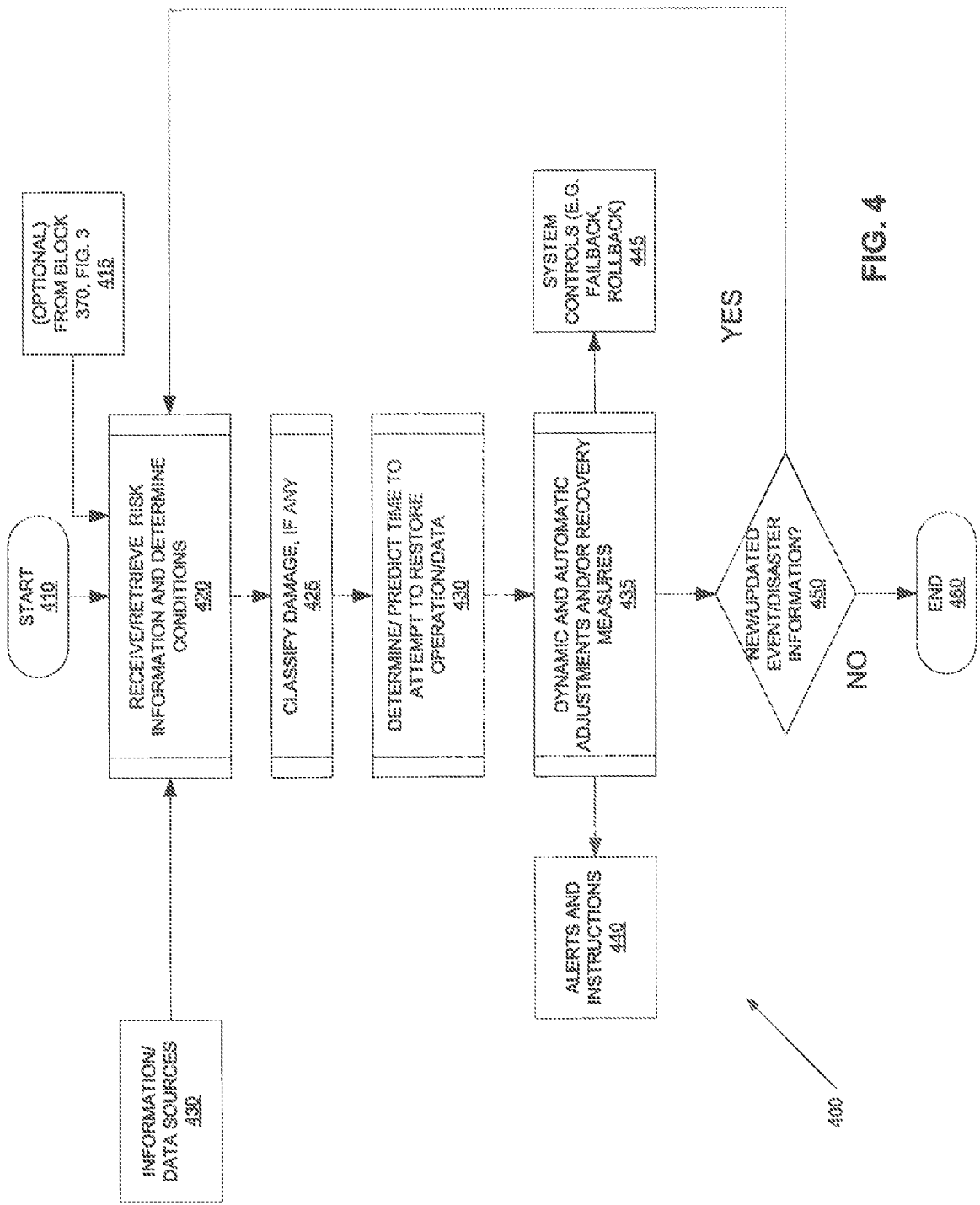
FIG. 4 is a simplified flowchart of a second method of preventative data protection, in accordance with at least one illustrative embodiment of the instant disclosure.

In decision block 365 of FIG. 3, if the outcome of this decision is YES, then, in some embodiments, the method proceeds to a post-adjustment process (block 370). Note that the "YES" path may, in some embodiments, be applicable only for a particular data center or location; that is, one data center or location may no longer be at risk for one particular kind of disaster or adverse event, though other types of adverse events or disasters might still present a risk for that data center/site or other ones. Thus, even though there is a "YES" outcome of decision block 365 that leads to post adjustment process (FIG. 4), in at least some embodiments, the processing of blocks 320-360 continues for other types of adverse events/disasters and for other data centers/sites (hence the dotted lines). For example, FIG. 4 is a simplified flowchart of a second method 400 of preventative data protection, in accordance with at least one illustrative embodiment of the instant disclosure, wherein the second method 400 helps to restore at least some operations of some systems substantially back to the condition they were before actions were taken in blocks 350-356 if, for those systems, the risk of a particular adverse event or disaster has passed. The restorations of FIG. 4 can occur, in some embodiments, in conditions such as when no event or disaster has ever occurred or when one or more disasters or adverse events have occurred and are over, especially where the nature of the disaster or negative event is such that some recovery of some operations is possible.

Referring to FIG. 4, at block 420, in some embodiments, information is retrieved and/or received about the one or more risks and one or more disasters, and a determination of conditions is made. In some embodiments, this information comes from one or more of the same types of sources (block 430) that either were queried or provided risk information and/or were data mined to determine and/or predict risk information, including direct messages or instructions (e.g., telephone calls or other specific information). Damages are also classified (block 425), in some embodiments, into those types that can be automatically and/or dynamically restored, those types that require manual action, those types that are not restorable, etc. Based at least in part on information received or obtained in block 420, and the classification of damages in block 425, a determination and/or prediction is made that one or more risks of one or more disasters and/or adverse events has passed or ended. Assuming this determination and/or prediction is made, in some embodiments, it will be otherwise safe to attempt to restore operation (blocks 435-445), e.g., in some embodiments, via failback and/or rollback operations. In some embodiments, the dynamic and automatic adjustments and/or recovery measures can include actions to reverse or undo, wholly or partially, the adjustments and/or preventative measures that were done in block 350. In some embodiments, the actions taken in block 435 are configured to attempt to substantially restore operation or data to substantially the same condition or operation (if possible) that existed prior to the adverse event or disaster (by "substantially," it is understood that it is not necessary to restore operation to the exact level it was before the first event, but rather the best possible level, given the conditions). In some embodiments, the actions taken in block 435 are entirely different kinds of actions that are necessitated based on whether or not the adverse event or disaster took place. As operation is restored, if additional information is received relating to the event or disaster (e.g., a YES answer at block 450), blocks 420-445 are repeated. Else, the method ends (i.e., a NO answer at block 450). In some embodiments, after the method 400 of FIG. 4 ends, the method of FIG. 3 is repeated to continually monitor data sources for information relating to additional adverse events or disasters. In some embodiments, even as the actions of the method 400 are taking place, the actions of the method 300 of FIG. 3 may still be taking place at substantially the same time.

In an illustrative example, suppose the disaster that occurred was a flood, and the information received at block 420 helps inform a decision or prediction that the floodwater will be sufficiently subsided within 2 hours to enable restoration of normal operations. In this example, in block 435, the automatic adjustments that can occur can include running one or more failback or rollback applications and synchronizing data from a remote location back to primary location via live migration to another site. For example, in some embodiments, the failback process can be similar to that described in the following commonly assigned U.S. Patents, each of which is hereby incorporated by reference: U.S. Pat. No. 8,898,409, entitled "JOURNAL-BASED REPLICATION WITHOUT JOURNAL LOSS"; U.S. Pat. No. 7,275,177, entitled "DATA RECOVERY WITH INTERNET PROTOCOL REPLICATION WITH OR WITHOUT FULL RESYNC"; U.S. Pat. No. 7,383,463, entitled "INTERNET PROTOCOL BASED DISASTER RECOVERY OF A SERVER", and U.S. Pat. No. 7,827,136, entitled "MANAGEMENT FOR REPLICATION OF DATA STORED IN A DATA STORAGE ENVIRONMENT INCLUDING A SYSTEM AND METHOD FOR FAILOVER PROTECTION OF SOFTWARE AGENTS OPERATING IN THE ENVIRONMENT". In some embodiments, the rollback process can be similar to processes described in one or more of the following commonly assigned U.S. patents, which are hereby incorporated by reference: U.S. Pat. No. 8,726,083, entitled "SYNCHRONIZED TAKING OF SNAPSHOT MEMORY IMAGES OF VIRTUAL MACHINES AND STORAGE SNAPSHOTS" and U.S. Pat. No. 8,726,066, entitled "JOURNAL BASED REPLICATION WITH ENHANCE FAILOVER".

Figure 7:
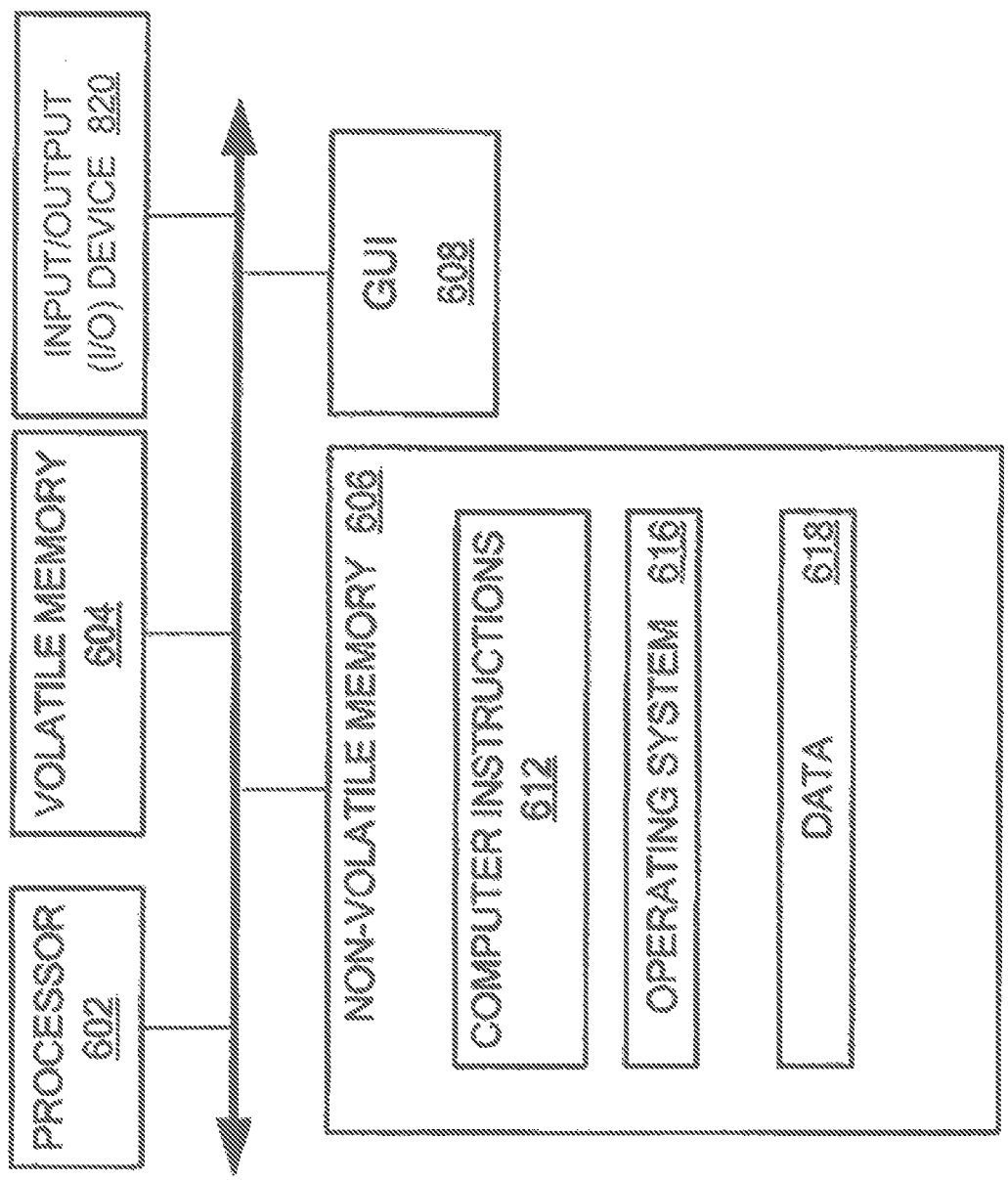
FIG. 7 is a simplified block diagram of an example of an apparatus that may perform at least a portion of the processes in FIGS. 3-6B.

As will be appreciated, the methods of FIGS. 3-6B may be performed using an apparatus. FIG. 7 is a simplified block diagram of an example of an apparatus that may perform at least a portion of the processes in FIGS. 3-6B.

Referring briefly back to FIG. 1, in at least some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 7. As shown in FIG. 7, computer 800 may include processor 802, volatile memory 804 (e.g., RAM), non-volatile memory 806 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes shown in FIGS. 4-6. Program code may be applied to data entered using an input device of GUI 808 or received from I/O device 820.

The methods of FIGS. 3-6B are not limited to use with the hardware and software of FIG. 7 and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 7, which is useful for carrying out a method described with reference to embodiments shown in, for example, FIGS. 3-6B. The processes described herein are not limited to the specific embodiments described. For example, processes of FIGS. 3, 4,5A, and 6A are not limited to the specific processing order shown therein. Rather, any of the blocks of the processes may be re-ordered, combined or removed, performed in parallel or in serial, as necessary, to achieve the results set forth herein.

Referring again to FIG. 7, processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 8:
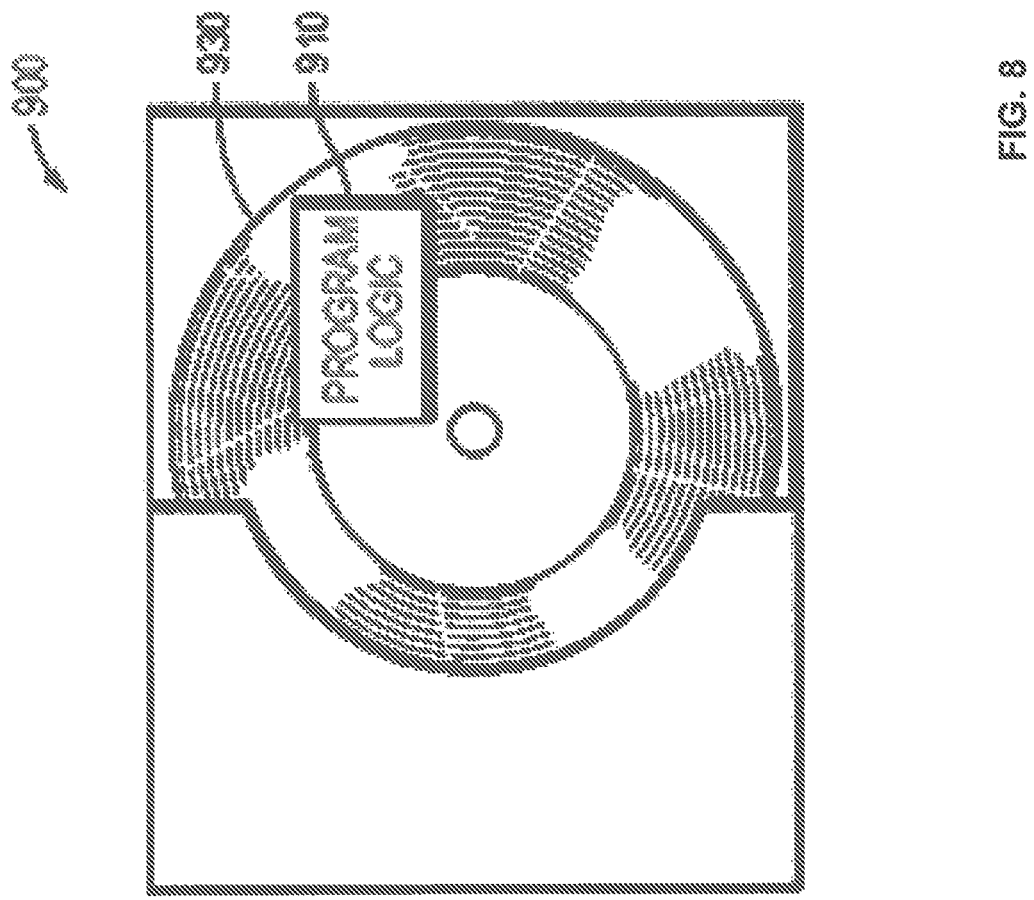
FIG. 8 is a simplified example of an embodiment of a method embodied on a computer readable storage medium

For example, when the program code is loaded into and executed by a machine, such as the computer of FIG. 7, the machine becomes an apparatus for practicing the invention. When implemented an one or more general-purpose processors, the program code combines with such a processor to provide a unique apparatus that operates analogously to specific logic circuits. As such a general purpose digital machine can be transformed into a special purpose digital machine. FIG. 8 is a simplified example of an embodiment of a method embodied on a compute readable storage medium that may utilize at least some of the techniques described herein in accordance with at least one embodiment of the present disclosure. For example, FIG. 8 shows program logic 910, embodied on a computer-readable medium 930 as shown, and wherein the Logic is encoded in computer-executable code configured for carrying out the reservation service process of this invention and thereby forming a Computer Program Product 900. The logic 910 may be the same logic on memory loaded on processor. The program logic 910 may also be embodied in software modules, as modules, or as hardware modules. A processor may be a virtual processor or a physical processor. Logic 910 may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:
1. A computer-implemented method, comprising:
receiving first information from at least a first data source, the first data source comprising a first plurality of data that originates independently of, and external to, a first computing entity that is associated with a first physical location and that is situated in a first municipal location, wherein the first plurality of data comprises first data relating to one or more first conditions that that have affected, are affecting, or could affect, the first municipal location itself, wherein each respective first condition of the one or more first conditions comprises at least one of: a first naturally occurring condition and a first human-induced condition, wherein the first information comprises information derived from the first plurality of data;
predicting, based at least in part on analysis of the received first information, a first risk of a first adverse event affecting the first municipal location, wherein the first adverse event comprises one or more first consequences that have potential to adversely affect operation of at least the first computing entity;
determining, based at least in part on the first risk, at least a first potential impact to the first computing entity resulting from at least one of the first adverse event and the one or more first consequence of that first adverse event;
dynamically causing at least a first action to occur, based on at least one of the first information, the first risk, and the first potential impact, wherein the first action is configured to at least partially mitigate the first potential impact to the first computing entity;

accessing second information from at least a second data source, the second data source comprising a second plurality of data that originates independently of, and external to, the first computing entity, wherein the second plurality of data comprises second data relating to one or more second conditions that that have affected, are affecting, or could affect, the first municipality itself, wherein each respective second condition of the one or more second conditions comprises at least one of: a second natural condition and a second human-induced condition, wherein the second information comprises information derived from the second plurality of data;

predicting, based at least in part on an analysis of the second information:
 a second risk that the first adverse event will affect the first municipality, wherein the second risk of the first adverse event comprises one or more second consequences that have potential to adversely affect operation of the first computing entity; and
 a first risk of a second adverse event, wherein the second adverse event comprises one or more third consequences that have potential to affect operation of at least the first computing entity;

determining, based at least in part on the second risk, at least a second potential impact to the first computing entity resulting from at least one of the second adverse event and the one or more third consequences of that second adverse event;

consolidating information relating to the first and second risks of the first adverse event, the first risk of the second adverse event, and the first and second potential impacts, to classify the first and second potential impacts based on a type of impact to the first computing entity and a timeline for when the respective first and second potential impacts could be expected; and dynamically causing at least a second action to occur, based on at least one of the second information, the second risk, and the second potential impact, wherein the second action is configured to at least partially mitigate the second impact to the first computing entity;

wherein a timing of causing the first and second actions is based at least in part on the classifying of the first and second impacts.

2. The method of claim 1, wherein the first computing entity comprises an apparatus, device, or system in operable communication with a first processor, and wherein the first processor is configured to at least partially implement the first action.

3. The method of claim 1, wherein the first risk comprises information relating to at least one of: a probability of the first adverse event, an expected time of the first adverse event, and an expected duration of the first adverse event.

4. The method of claim 1, wherein the first adverse event comprises an event that has not yet occurred by a time of the determination of the first adverse impact.

5. The method of claim 4, wherein, if the first adverse event has not occurred by a time that the prediction of the first adverse impact takes place, then the method further comprises dynamically causing the first action to occur before the first adverse event.

6. The method of claim 1, wherein the first adverse event comprises an event that is occurring at substantially the same time that the first information is received.

7. The method of claim 1, wherein the first computing entity is in a first condition prior to the first adverse event and a second condition after the first adverse event, wherein the method further comprises dynamically causing a second action to occur after the first adverse event has occurred, the second action configured to attempt to at least partially restore the first computing entity from the second condition to the first condition.

8. The method of claim 1, further comprising:
analyzing a plurality of third information accessed from a plurality of third data sources, each respective third data source comprising a respective third plurality of data that originates independently of, and external to, a plurality of respective third computing entities associated with a plurality of respective third physical locations, each respective third physical location situated in a respective third municipal location, wherein the third plurality of data comprises third data relating to one or more respective third conditions that have affected, are affecting, or could affect, each of the respective third municipalities themselves, wherein each respective third condition comprises at least one of: a third naturally occurring condition and a third human-induced condition, wherein each respective third information comprises information derived from each respective third plurality of data, wherein each respective third information is usable to be analyzed to predict one or more respective third risks that a respective third adverse event will affect the respective third municipality, wherein the respective third adverse event comprises one or more respective third consequences that have potential to adversely affect operation of at least the respective third computing entity;

determining, based at least in part on the one or more respective third risks, one or more respective third potential impacts to the respective third computing entity, resulting from at least one of the respective third adverse event and the one or more respective third consequences of the respective third adverse event, wherein the one or more third impacts relate to one or more of the probability, timing, and duration associated with the one or more third risks and relating to one or more ways the one or more third risks affect one or more of the plurality of third computing entities; and dynamically causing one or more third actions to occur, based on at least one of the plurality of third information, the one or more third risks, and the one or more third potential impacts, wherein each respective third action is configured to at least partially mitigate at least one predicted respective third impact of one or more of the respective third adverse events.

9. The method of claim 1, wherein at least partially mitigating the first impact comprises at least partially preventing at least one condition selected from the group consisting of data loss at the first computing entity, operational outage of the first computing entity, reduced performance of the first computing entity, and damage to at least a portion of the first computing entity.

10. The method of claim 1, wherein the analysis of the received first information uses a data analytics system that is configured to perform data mining of a plurality of data resources and, based on analysis provided by the data analytics system, to provide a risk value for the first adverse event.

11. A system, comprising:
a processor;
memory in operable communication with the processor, the memory storing computer program code that when executed on the processor causes the processor to perform operations of:

receiving first information from at least a first data source comprising a first plurality of data that originates independently of, and external to, a first computing entity that is associated with a first physical location and that is situated in a first municipal location, wherein the first plurality of data comprises first data relating to one or more first conditions that that have affected, are affecting, or could affect, the first municipal location itself, wherein each respective first condition of the one or more first conditions comprises at least one of: a first naturally occurring condition and a first human-induced condition, wherein the first information comprises information derived from the first plurality of data;

predicting, based at least in part on analysis of the received first information, a first risk of a first adverse event affecting the first municipal location, wherein the first adverse event comprises one or first consequences that have potential to adversely affect operation of at least the first computing entity;

determining, based at least in part on the first risk, at least a first potential impact to the first computing entity resulting from at least one of the first adverse event and the one or more first consequences of that first adverse event;

dynamically causing at least a first action to occur, based on at least one of the first information, the first risk, and the first potential impact, wherein the first action is configured to at least partially mitigate the first impact to the first computing entity;

analyzing second information received from a second data source, the second data source comprising a respective second plurality of data that originates independently of, and external to, the first computing entity, wherein the second plurality of data comprises second data relating to one or more second conditions that that have affected, are affecting, or could affect, the first municipal location itself, wherein each respective second condition of the one or more second conditions comprises at least one of: a second natural condition and a second human-induced condition wherein the second information comprises information derived from the second plurality of data;

predicting, based at least in part on an analysis of the second information:
 a second risk that the first adverse event will affect the first municipal location, wherein the second risk of the first adverse event comprises one or more second consequences that have potential to adversely affect operation of the first computing entity; and
 a first risk of a second adverse event, wherein the second adverse event comprises one or more third consequences that have potential to affect operation of at least the first computing entity;

determining, based at least in part on the second risk, at least a second potential impact to the first computing entity resulting from at least one of the second adverse event and the one or more third consequences of that second adverse event;

consolidating information relating to the first and second risks of the first adverse event, the first risk of the second adverse event, and the first and second potential impacts, to classify the first and second potential impacts based on a type of impact to the first computing entity and a timeline for when the respective first and second potential impacts could be expected; and dynamically causing at least a second action to occur, based on at least one of the plurality of second information, the one or more second risks, and the one or more second potential impacts, wherein the second action is configured to at least partially mitigate the second impact to the first computing entity.

12. The system of claim 11, wherein the first adverse event comprises an event that has not yet occurred by a time of the determination of the first adverse impact.

13. The system of claim 12, wherein the memory stores computer code that when executed on the processor causes the processor to perform an operation of dynamically causing the first action to occur before the first adverse event, if the first adverse event has not occurred by a time that the prediction of the first adverse impact takes place.

14. The system of claim 11, wherein the first computing entity is in a first condition prior to the first adverse event and a second condition after the first adverse event and wherein the memory further stores computer program code that when executed on the processor causes the processor to perform an operation of dynamically causing a second action to occur after the first adverse event has occurred, the second action configured to attempt to at least partially restore the first computing entity from the second condition to the first condition.

15. The system of claim 11, wherein mitigating the first impact comprises at least partially preventing at least one situation selected from a group consisting of data loss at the first computing entity, operational outage of the first commuting entity, reduced performance of the first computing entity, and damage to at least a portion of the first computing entity.

16. The method of claim 11, wherein the analysis of the received first information uses a data analytics system that is configured to perform data mining of a plurality of data resources and, based on an analysis provided by the data analytics system, provide a risk value for at least one adverse event.

17. The system of claim 11, wherein the first risk comprises information relating to at least one of: a probability of the first adverse event, an expected time of the first adverse event, and an expected duration of the first adverse event.

18. The system of claim 11, wherein the first adverse event comprises an event that is occurring at substantially the same time that the first information is received.

19. A computer program product including a non-transitory computer readable storage medium having computer program code encoded thereon that when executed on a processor of a computer causes the computer to operate a storage system, the computer program product comprising:
 computer program code for receiving first information from at least a first data source comprising a first plurality of data that originates independently of, and external to, a first computing entity associated that is associated with a first physical location and that is situated in a first municipal location, wherein the first plurality of data comprises first data relating to one or more first conditions that that have affected, are affecting, or could affect, the first municipal location itself, wherein each respective first condition of the one or more first conditions comprises at least one of: a first naturally occurring condition and a first human-induced condition, wherein the first information comprises information derived from the first plurality of data;
computer program code for predicting, based at least in part on analysis of the received first information, a first risk of a first adverse event affecting the first municipal location, wherein the first adverse event comprises one or more first consequences that have potential to affect operation of at least the first computing entity;
computer program code for determining, based at least in part on the first risk, at least a first potential impact to the first computing entity resulting from at least one of the first adverse event and the one or more first consequences of that first adverse event;
computer program code for dynamically causing at least a first action to occur, based on at least one of the first information, the first risk, and the first potential impact, wherein, the first action is configured to at least partially mitigate the first impact to the first computing entity;
computer program code for analyzing second information received from a second data source, the second data source comprising a respective second plurality of data that originates independently of, and external to, the first computing entity, wherein the second plurality of data comprises second data relating to one or more second conditions that that have affected, are affecting, or could affect, the first municipal location itself, wherein each respective second condition of the one or more second conditions comprises at least one of: a second natural condition and a second human-induced condition, wherein the second information comprises information derived from the second plurality of data;
computer program code for predicting, based at least in part on an analysis of the second information:
a second risk that the first adverse event will affect the first municipal location, wherein the second risk of the first adverse event comprises one or more second consequences that have potential to adversely affect operation of the first computing entity; and
a first risk of a second adverse event, wherein the second adverse event comprises one or more third consequences that have potential to affect operation of at least the first computing entity;
computer program code for determining, based at least in part on the second risk at least a second potential impact to the first computing entity resulting from at least one of the second adverse event and the one or more third consequences of that second adverse event;
computer program code for consolidating information relating to the first and second risks of the first adverse event, the first risk of the second adverse event, and the first and second potential impacts, to classify the first and second potential impacts based on a type of impact to the first computing entity and a timeline for when the respective first and second potential impacts could be expected; and
computer program code for dynamically causing at least a second action to occur, wherein the second action is configured to at least partially mitigate the second impact to the first computing entity.

20. The computer program product of claim 19, wherein the first computing entity is in a first condition prior to the first adverse event and a second condition after the first adverse event, wherein the computer program product further comprises computer program code for dynamically causing a second action to occur after the first adverse event has occurred, the second action configured to attempt to at least partially restore the first computing entity from the second condition to the first condition.

* * * * *